AIRPLANE HAVING CHANGEABLE THRUST DIRECTION

Filed April 13, 1961 18 Sheets-Sheet 1

INVENTOR.
HENRY H. W. QUENZLER
BY
Robert W. Beach
ATTORNEY

May 14, 1963 H. H. W. QUENZLER 3,089,666

AIRPLANE HAVING CHANGEABLE THRUST DIRECTION

Filed April 13, 1961 18 Sheets-Sheet 2

INVENTOR.
HENRY H. W. QUENZLER

BY

Robert W. Beach

ATTORNEY

May 14, 1963 H. H. W. QUENZLER 3,089,666

AIRPLANE HAVING CHANGEABLE THRUST DIRECTION

Filed April 13, 1961 18 Sheets-Sheet 3

INVENTOR.
HENRY H. W. QUENZLER
BY
Robert W. Beach
ATTORNEY

May 14, 1963 H. H. W. QUENZLER 3,089,666

AIRPLANE HAVING CHANGEABLE THRUST DIRECTION

Filed April 13, 1961 18 Sheets-Sheet 4

INVENTOR.
HENRY H. W. QUENZLER
BY
Robert W. Beach
ATTORNEY

May 14, 1963 H. H. W. QUENZLER 3,089,666

AIRPLANE HAVING CHANGEABLE THRUST DIRECTION

Filed April 13, 1961 18 Sheets-Sheet 5

INVENTOR.
HENRY H. W. QUENZLER

BY Robert W. Beach

ATTORNEY

May 14, 1963 H. H. W. QUENZLER 3,089,666

AIRPLANE HAVING CHANGEABLE THRUST DIRECTION

Filed April 13, 1961 18 Sheets-Sheet 6

INVENTOR.
HENRY H. W. QUENZLER

BY

Robert W. Beach

ATTORNEY

INVENTOR.
HENRY H. W. QUENZLER
BY
Robert W. Beach
ATTORNEY

INVENTOR.
HENRY H. W. QUENZLER
BY
Robert W. Beach
ATTORNEY

INVENTOR.
HENRY H. W. QUENZLER
BY
Robert W. Beach
ATTORNEY

May 14, 1963 H. H. W. QUENZLER 3,089,666

AIRPLANE HAVING CHANGEABLE THRUST DIRECTION

Filed April 13, 1961 18 Sheets-Sheet 10

INVENTOR.
HENRY H. W. QUENZLER

BY
Robert W. Beach

ATTORNEY

INVENTOR.
HENRY H.W. QUENZLER
BY Robert W. Beach
ATTORNEY

May 14, 1963 H. H. W. QUENZLER 3,089,666

AIRPLANE HAVING CHANGEABLE THRUST DIRECTION

Filed April 13, 1961 18 Sheets-Sheet 12

INVENTOR.
HENRY H. W. QUENZLER
BY
Robert W. Beach
ATTORNEY

INVENTOR.
HENRY H.W. QUENZLER
BY
Robert W. Beach
ATTORNEY

AIRPLANE HAVING CHANGEABLE THRUST DIRECTION

Filed April 13, 1961

18 Sheets-Sheet 14

INVENTOR.
HENRY H. W. QUENZLER
BY Robert W. Beach
ATTORNEY

INVENTOR.
HENRY H. W. QUENZLER
BY
Robert W. Beach
ATTORNEY

INVENTOR.
HENRY H. W. QUENZLER
BY Robert W. Beach
ATTORNEY

May 14, 1963 H. H. W. QUENZLER 3,089,666

AIRPLANE HAVING CHANGEABLE THRUST DIRECTION

Filed April 13, 1961

18 Sheets-Sheet 17

INVENTOR.
HENRY H. W. QUENZLER

BY Robert W. Beach

ATTORNEY

May 14, 1963 H. H. W. QUENZLER 3,089,666

AIRPLANE HAVING CHANGEABLE THRUST DIRECTION

Filed April 13, 1961

18 Sheets-Sheet 18

INVENTOR.
HENRY H. W. QUENZLER

BY Robert W. Beach

ATTORNEY

United States Patent Office 3,089,666
Patented May 14, 1963

3,089,666

AIRPLANE HAVING CHANGEABLE THRUST DIRECTION

Henry H. W. Quenzler, Seattle, Wash., assignor to Boeing Airplane Company, Seattle, Wash., a corporation of Delaware Filed Apr. 13, 1961, Ser. No. 102,708
24 Claims. (Cl. 244—7)

This invention relates to airplanes having power plants the thrust directions of which relative to the aircraft fuselage can be changed so as to produce primarily a forward thrust to effect forward movement of the aircraft, or primarily a vertical thrust upward to facilitate rising of the airplane during takeoff, or controlled descent during landing of the airplane in a confined area. Such airplane has fixed wings for supporting the airplane during substantially horizontal flight.

An important object of the present invention is to provide an airplane which can rise from and descend to the ground steeply, or vertically, while also being capable of normal substantially horizontal flight as an airplane in an efficient manner. Thus, while the propulsion mechanism is arranged to produce an effective upward thrust when desired, such mechanism can be altered to produce a forward thrust and under such conditions will have low drag characteristics. Moreover, such change in thrust direction can be accomplished reasonably quickly without producing undesirable forces on, or stresses in, the airplane.

It is also an important object to provide an airplane propulsion system the thrust direction of which can be changed from substantially horizontal to substantially vertical without greatly increasing the weight of the airplane components, or substantially increasing the complexity of its construction. In accomplishing this object the lift forces produced by power plants creating a vertical thrust are preferably applied to the wings and the wings, in turn, lift the fuselage in generally conventional fashion, or the lift forces may be applied directly to the fuselage.

In accomplishing such general objects it is a specific object to mount the power plants on the airplane wings and to arrange them in a manner to produce the least stress concentration in each wing when they are exerting a lifting force on it. Thus, power plants producing a substantially equal thrust will be mounted in corresponding locations fore and aft of the wing so as to produce torsionally balanced forces on the wing. Such power plants are mounted reasonably near the wing root where the wing structure is stronger, in preference to mounting them at or near the wing tip, and if more than one power plant is mounted on one section of the wing such power plants should be distributed along the wing in an arrangement corresponding generally to the strength of the wing. Moreover, rotation of fore and aft engines of a pair rotate in opposite directions so as to balance their torque. Such an arrangement also results in balanced gyroscopic moments produced during change of thrust direction of such engines.

In mounting the power plants on the airplane wings it is an object to avoid as far as possible the creation of negative lift conditions on the wing, especially during change in thrust direction of the power plants between vertical and horizontal, and consequent reduction in load-carrying ability. Such object may largely be accomplished by mounting the power plants in nacelles depending below the wings and fore and aft respectively of the leading edges and trailing edges of the wings so that when the propeller thrust directions are upright the propeller plane of the forward propeller will be below the upper surface of the wing. Location of the propeller planes completely out of vertical registry with the wing also results in maximum effectiveness of the thrust produced by each power plant in the vertical direction. Alternatively, fore and aft propeller units could be mounted directly on the fuselage as distinguished from outrigger supports.

More specifically, it is an object to swing propellers or propeller driving power plants in corresponding positions adjacent to the fore and aft edges of a wing about axes located near the propellers, so that the forward propeller hub will be elevated as little as possible to reduce interference with the airflow about the wing and the hub of the aft propeller will be lowered a minimum amount so as to provide adequate ground clearance while both of the propeller hubs are moved toward the wing as little as possible.

When the power plants are located on the wing in positions in which the flow of air produced by the forward propeller creates an adverse effect on the lift of a wing during transitional movement of the power plants in changing thrust direction, it is an object to provide wing lift modifying devices such as leading edge slots and/or extensions, or trailing edge flaps, or both, aft of the forward propeller, the movement of which is automatically controlled in response to the speed of the airplane so as to increase the effectiveness of the wing to produce lift at low forward speeds.

Another object is to control the change in thrust direction of aircraft power plants so as to produce a small rearward thrust component, if desired, in conjunction with a large vertical thrust component to reduce the speed of the airplane in preparation for landing, or to improve the maneuverability and steering ability of the airplane in other situations.

It is an object to distribute the propulsive units so that lifting forces produced by them will be equalized at opposite sides of the center of gravity of the airplane to maintain stable flight conditions during abrupt rise and descent of the airplane.

More particularly, it is an object to provide one, two or more wings spaced longitudinally of the airplane so that in normal flight their lift forces balance generally about the center of gravity of the airplane. The power plants will be distributed on such wings so as to produce the equal lifting forces at opposite sides of the airplane's longitudinal axis, as well as substantially equal forces fore and aft of the airplane's center of gravity.

An additional object is to coordinate, or to provide control mechanism for coordinating, the change in direction of the several power plants so that the vertical components of the thrusts produced by such power plants will remain generally in such balance during transitional movement of the power plants changing the thrust direction between substantially horizontal and substantially vertical directions.

To promote the stability of the aircraft it is an object for the lines of thrust of the several power plants principally vertical to converge upwardly substantially to a focus directly above the center of gravity of the airplane to deter both roll and pitch of the airplane. It is a further object, however, to enable selected power plants to be moved for shifting their lines of thrust for the purpose of producing controlled roll or pitching movements of the airplane.

In order to maintain desirable balance of forces and stabilization of the airplane during abrupt ascent or descent maneuvers, it is an object to deenergize automatically the other power plant of a pair of power plants which may fail, and/or to deenergize the power plant at the diametrically opposite side of the center of gravity from a power plant which has failed, unless provision is made for compensating for the change in thrust pattern produced by such power plant failure so as to avoid undesirable unbalancing resulting from the thrust forces produced by the remaining power plants in operation during an abrupt ascent or descent.

Another object is to provide an arrangement of power plants in which it is practical, and may be desirable, to deenergize selected power plants during horizontal flight of the airplane.

Another object is to provide an arrangement of airplane power plants in accordance with the present invention in which some, or all, of the power plants can be of the jet or rocket type. In such case it is a specific object to arrange jet or rocket power plants in fore and aft tandem pairs disposed so that the discharge from the forward power plant will not be projected directly toward the aft power plant of such a pair.

An additional object is to provide an airplane power plant installation which can be operated satisfactorily in positions such that the line of thrust is in a selected position between horizontal and vertical to expedite takeoff of the airplane under conditions in which it is not necessary for the airplane to ascend substantially vertically during takeoff.

A power plant installation for an airplane which will accomplish objects discussed above may include one pair of fixed wings extending oppositely from the upper portion of an airplane fuselage, or a plurality of such wing pairs spaced longitudinally of the fuselage and arranged substantially symmetrically fore and aft of the center of gravity of the airplane. Each wing carries one or more pairs of power plants depending beneath it. Each pair of power plants includes a forward power plant located adjacent to the leading edge of the wing and an aft power plant adjacent to the trailing edge of the wing mounted in a nacelle. While these power plants may be of the jet type they are preferably of the propeller type. Alternatively a propeller unit could be mounted directly on each end of the fuselage respectively fore and aft of the wing. The tractor propeller of the forward power plant and the pusher propeller of the aft power plant, or the power plants and propellers, are respectively mounted to swing about horizontal axes from positions in which their lines of thrust are directed substantially horizontal into positions in which their lines of thrust are directed substantially vertically upward. When the propeller thrusts are substantially vertical the front propeller should be ahead of the wing's leading edge and the rear propeller should be behind the wing's trailing edge and the forward propeller should be lower than the wing's upper surface.

When the thrusts of the various power plants of the airplane are directed upward they are distributed in thrust-balanced arrangement fore and aft and at opposite sides of the airplane's center of gravity. It is preferred that the thrust lines all converge substantially to a point approximately directly above the center of gravity of the airplane. The forward and aft power plants of each pair should be interconnected so that they will be swung conjointly in related degrees during transition for moving their thrust lines between substantially horizontal and substantially vertical positions. Wing lift characteristic control devices, such as leading edge extensions and trailing edge flaps, can be provided and automatically controlled in response to the forward speed of the airplane so that such wing lift modifying devices will be actuated simultaneously with swinging of the power plants to enable the wings to produce effective lift at low forward speeds.

In addition, dynamic control devices can be provided, such as a tail jet controllable to exert a positive side thrust in one direction or the other for yaw control and/or a positive upward or downward thrust for pitch or trimming control, and jets laterally offset from the longitudinal axis of the airplane, such as being associated with corresponding power plant units at opposite sides of the longitudinal axis, for effecting roll control of the airplane when it is moving principally vertically during takeoff or landing and while its longitudinal axis is disposed substantially horizontal. The control mechanism may also include safety devices for deenergizing one power plant if a power plant diametrically opposite across the airplane's center of gravity should fail partially or completely.

FIGURE 1 is a top perspective of an airplane illustrating one embodiment of the present invention in which the power plants have their lines of thrust directed substantially horizontally, and FIGURE 2 is a plan of that airplane.

FIGURE 3 is a front elevation and FIGURE 4 is a side elevation of the airplane shown in FIGURES 1 and 2 in which the power plants have been swung to direct their lines of thrust substantially vertically. FIGURE 5 is a front elevation similar to FIGURE 3 indicating the restoring force produced by power plants when the airplane rolls, and FIGURE 6 is a side elevation similar to FIGURE 4 but indicating the restoring force produced by power plants when the airplane pitches.

Figure 11:
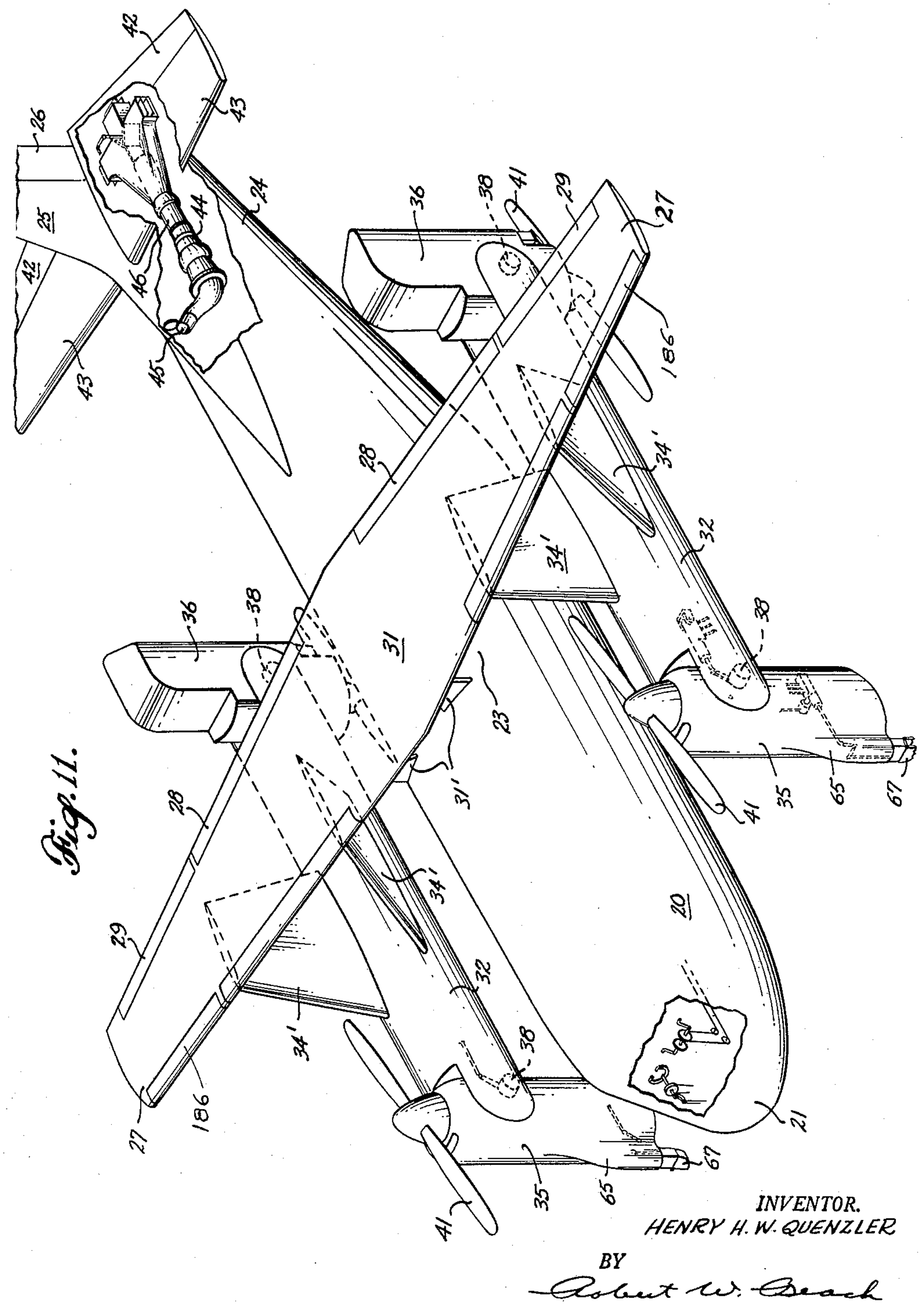
FIGURE 11 is a top perspective of an airplane generally similar to the air plane shown in FIGURE 9 which includes dynamic control mechanism.
Figure 12:
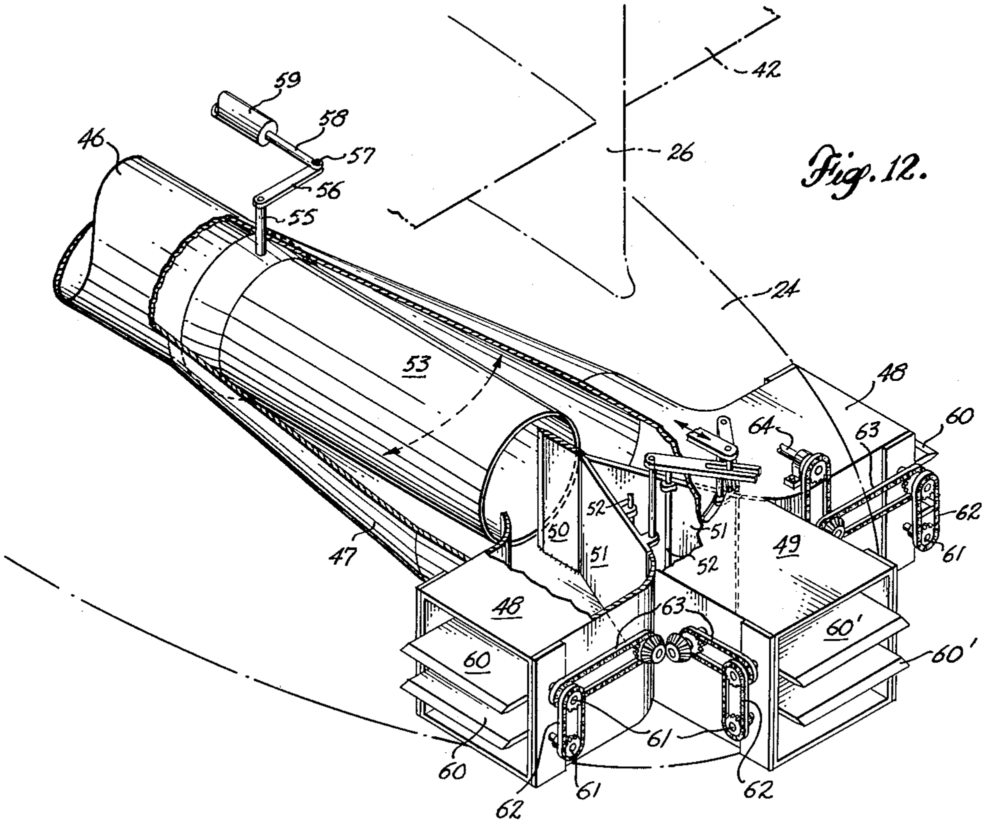
Figure 13:
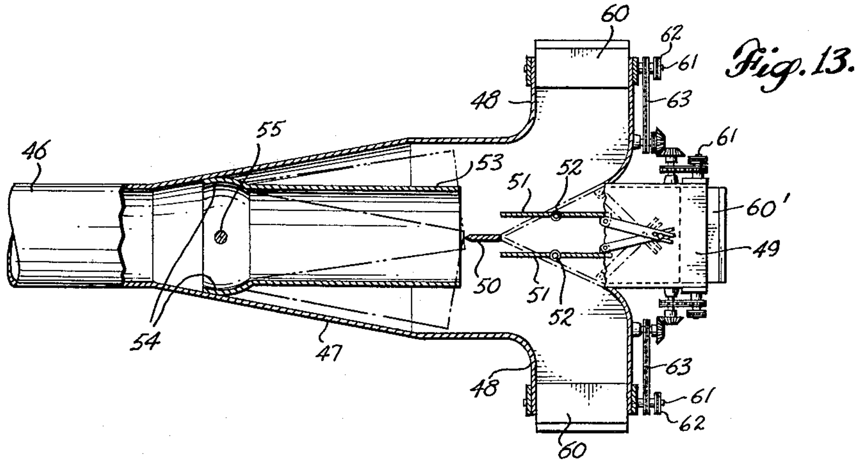
Figures 14, 15, 16:
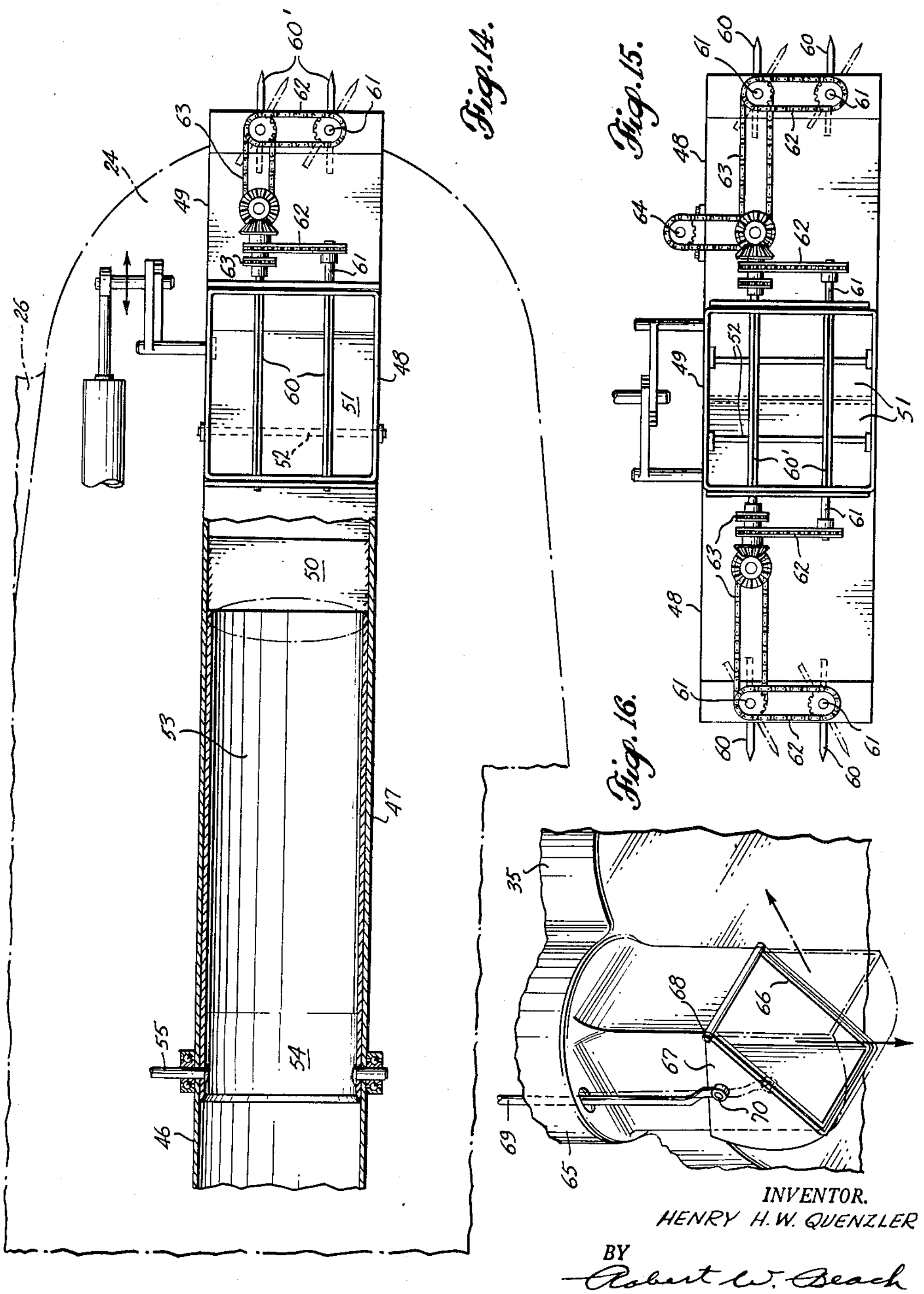

FIGURE 12 is a top perspective of the aft end of the airplane shown in FIGURE 11 with the configuration of part of the airplane fuselage empennage shown in phantom, illustrating steering jet mechanism, parts of which are broken away, and FIGURE 13 is a plan of such steering jet mechanism with parts broken away. FIGURE 14 is a side elevation of such steering jet mechanism with parts broken away, and FIGURE 15 is a rear elevation of such mechanism.

FIGURE 16 is a bottom perspective on an enlarged scale of roll control mechanism such as shown in FIGURE 11.

Figure 2:
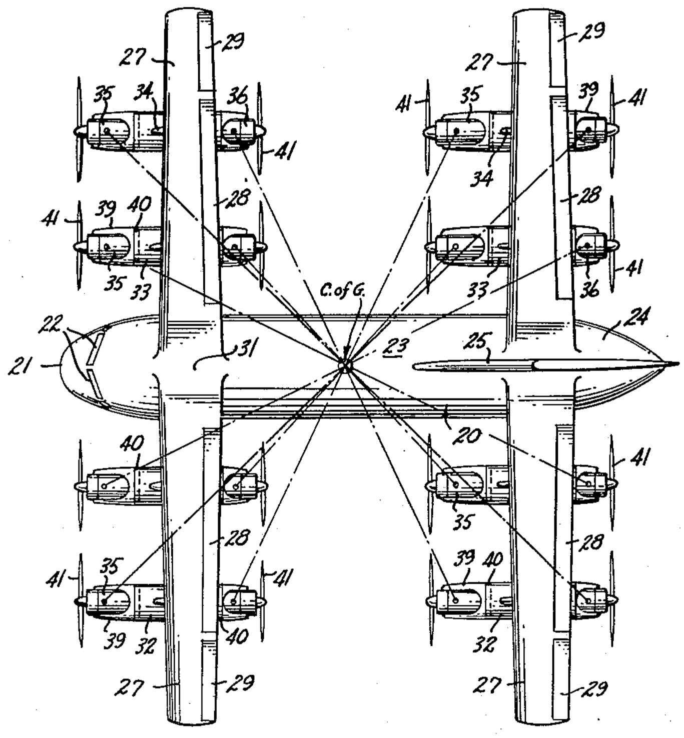
Figure 17:
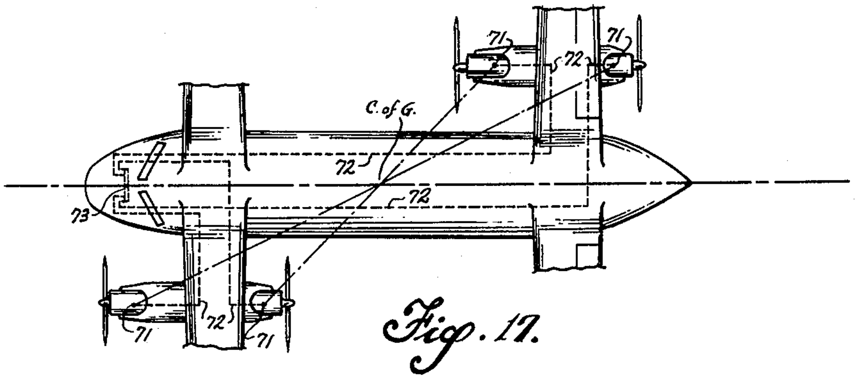
Figure 18:
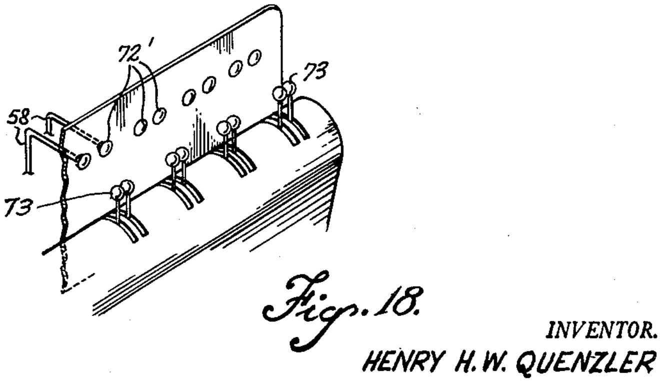

FIGURE 17 is a plan of an airplane like that shown in FIGURE 2 with parts broken away and illustrating diagrammatically signalling mechanism for power plants. FIGURE 18 is a top perspective of a control panel in the cockpit of the airplane shown in FIGURE 2 with parts broken away.

Figure 19:
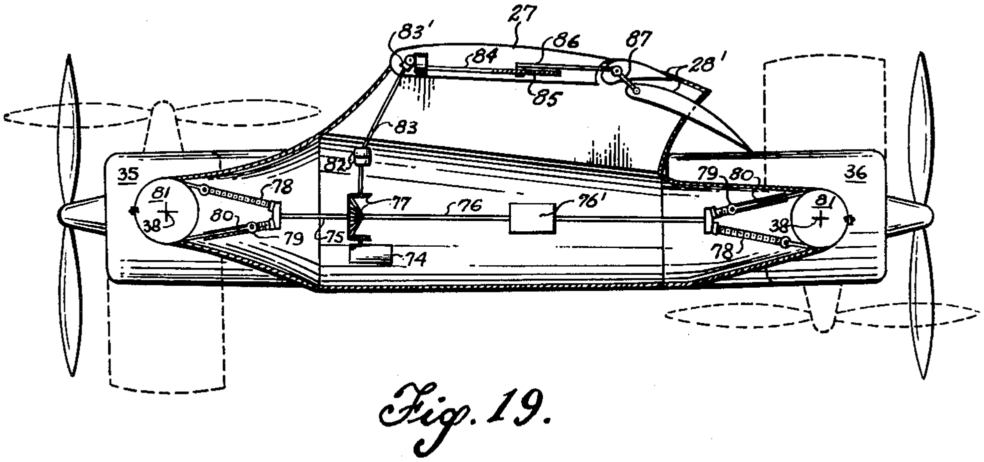

FIGURE 19 is a side elevation of the installation of a pair of power plants on a wing embodying lift modification devices, parts being broken away, and including mechanism, shown somewhat diagrammatically, connecting the power plants for conjoint swinging.

FIGURES 20 to 26, inclusive, are side elevations of the central portion of the airplane shown in FIGURE 11 with the power plants illustrated in different swung positions for executing different flight maneuvers.

Figures 27, 28, 29, 30, 31, 32, 33:
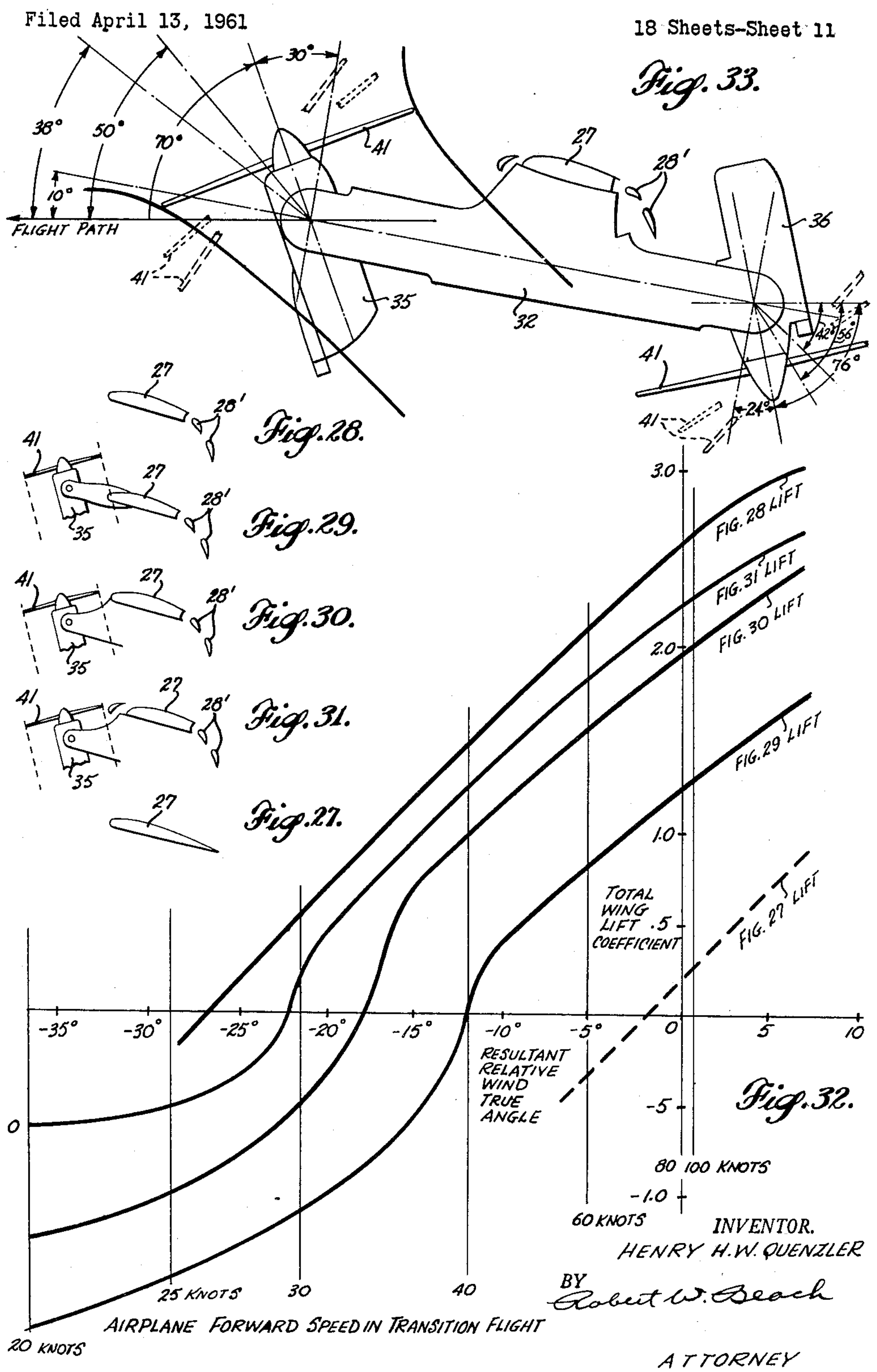

FIGURES 27, 28, 29, 30 and 31 are diagrammatic longitudinal sections illustrating airplane wing and airplane wing and propeller unit arrangements, and FIGURE 32 is a diagram of wing lift curves corresponding to such various arrangements.

FIGURE 33 is a diagrammatic elevation of a tandem propeller unit installation illustrating coordinated swinging of such propeller units during transition between principally vertical and substantially horizontal flight.

Figure 34:
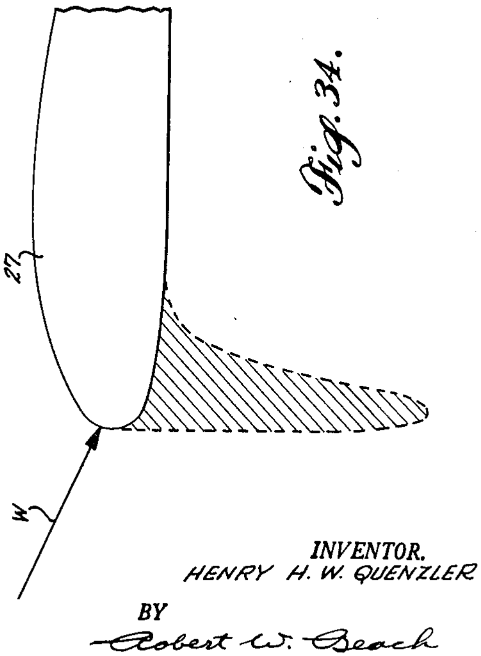

FIGURE 34 is a diagrammatic chordal section through the leading portion of an airplane wing indicating a representative negative lift pattern.

Figure 35:
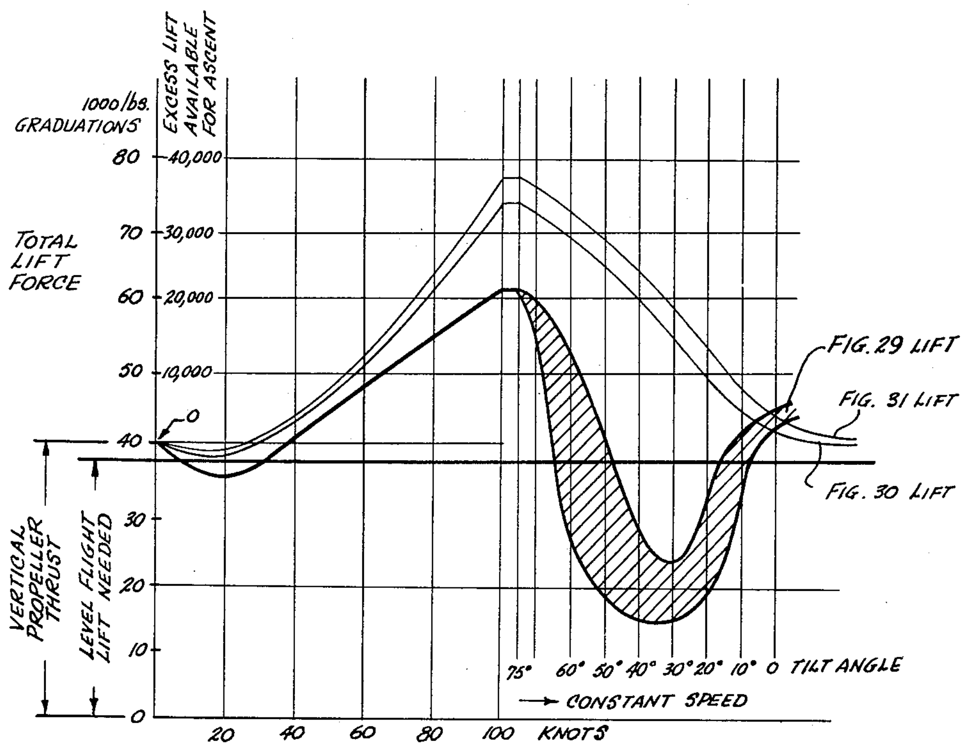

FIGURE 35 is a diagram illustrating propeller unit lift and wing lift during transition flight.

Figure 36:
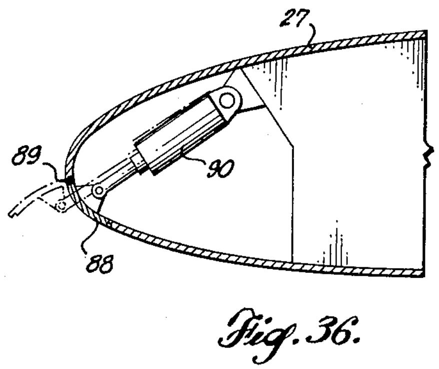

FIGURE 36 is a chordal section through the leading portion of an airplane wing showing a leading edge projection device.

Figure 37:
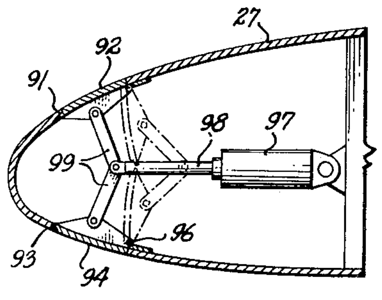

FIGURE 37 is a chordal section through the leading portion of an airplane wing showing slot control mechanism.

Figure 39:
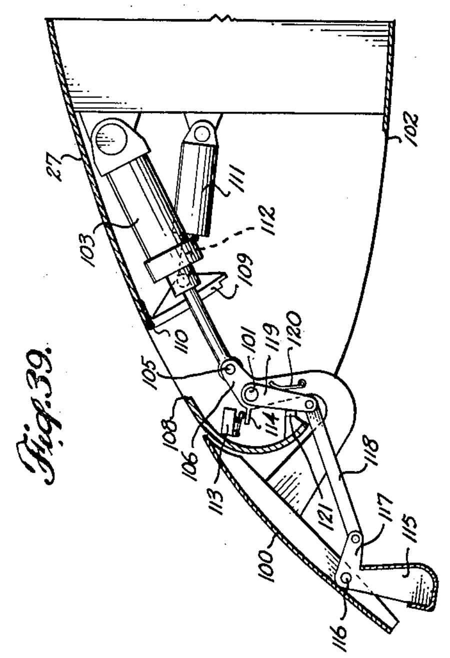
Figure 40:
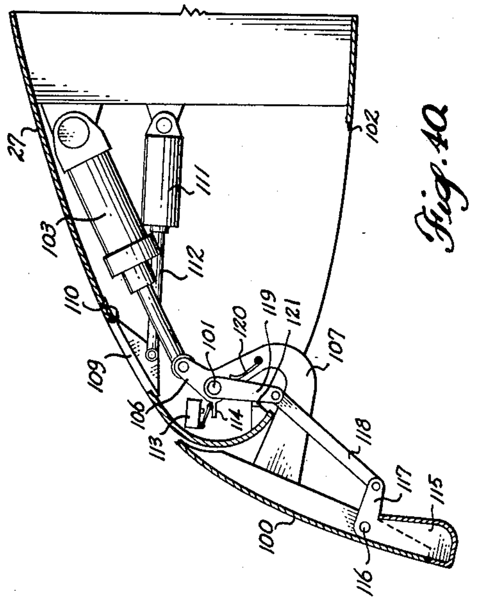
Figure 38:
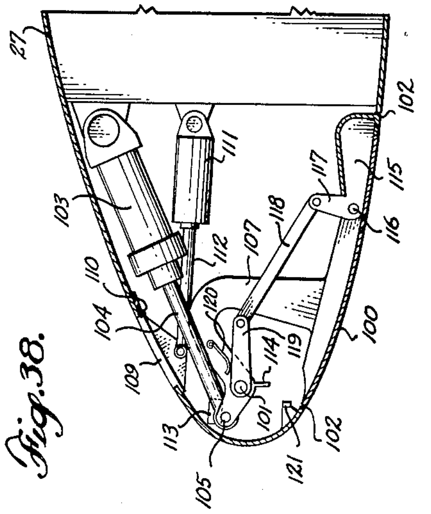

FIGURE 38 is a chordal section through the leading portion of an airplane wing having both a leading edge slot and an extension. FIGURE 39 is a similar view with the leading edge extension shown in fully extended position, and FIGURE 40 is a similar view with the extension in partially retracted position.

Figures 41, 42, 43, 44:
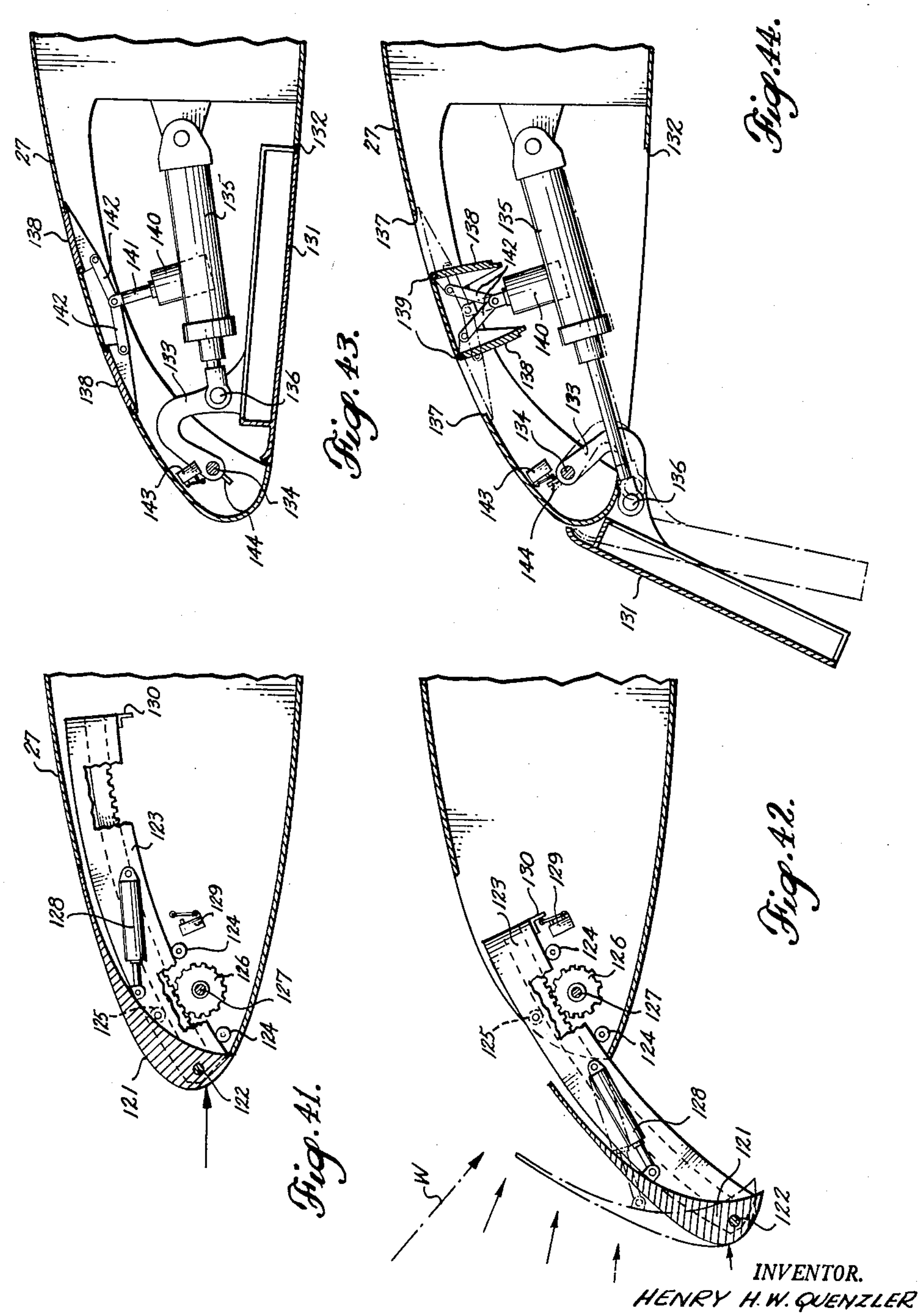

FIGURE 41 is a chordal section through the leading portion of an airplane wing having another type of leading edge slot and extension with the extension being shown in retracted position, and FIGURE 42 is a similar view showing the extension in extended position.

FIGURE 43 is a chordal section through the leading portion of an airplane wing having a leading edge slot and extension different from that shown in FIGURES 38 to 42 with the extension in the retracted position, and FIGURE 44 is a similar view showing the extension in a different position.

Figure 45:
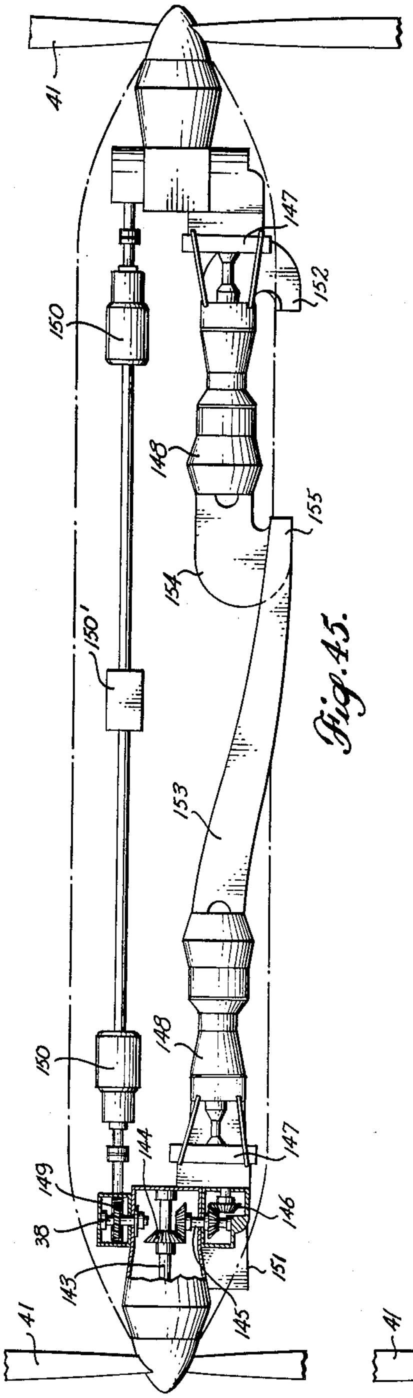
Figure 46:
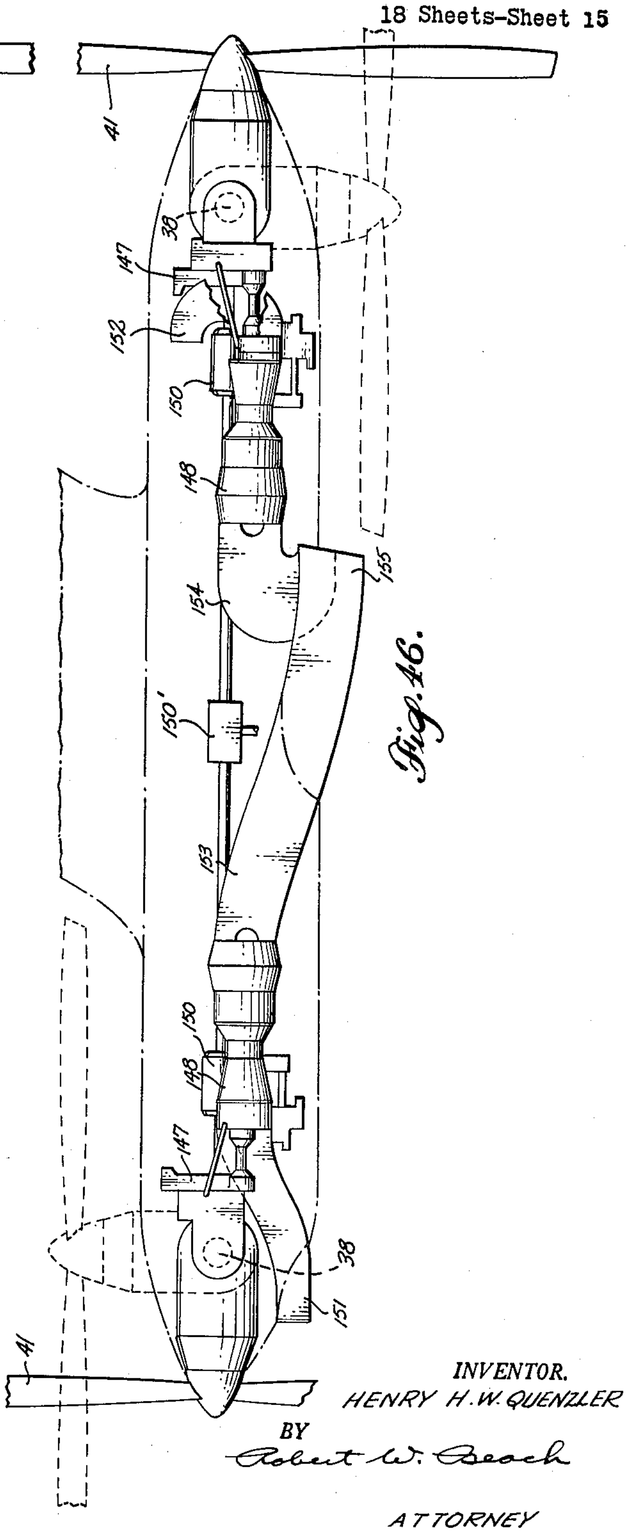

FIGURE 45 is a horizontal longitudinal section through an engine nacelle looking downward and showing fore and aft turbine power plants driving tilting propellers, parts being broken away, and FIGURE 46 is a vertical longitudinal section through such a nacelle.

Figures 47, 48:
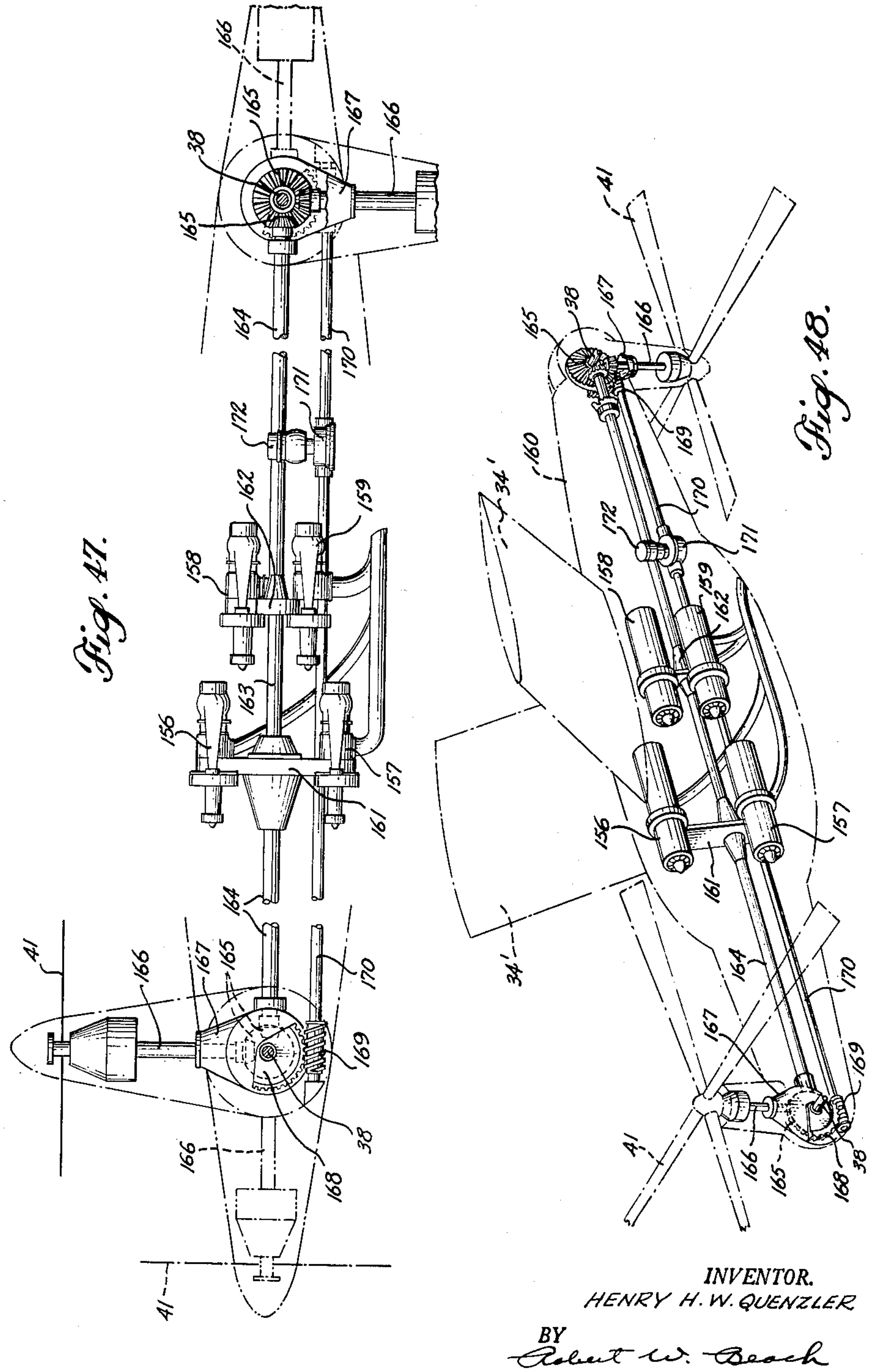

FIGURE 47 is a somewhat diagrammatic vertical longitudinal section through a nacelle showing twin turbine engines interconnected to drive a front propeller and twin turbine engines interconnected to drive a rear propeller in a nacelle, the two sets of twin turbine engines themselves being interconnected, and the front and rear propellers being interconnected for conjoint swinging relative to the driving turbines. FIGURE 48 is a top perspective of the same installation.

Figure 49:
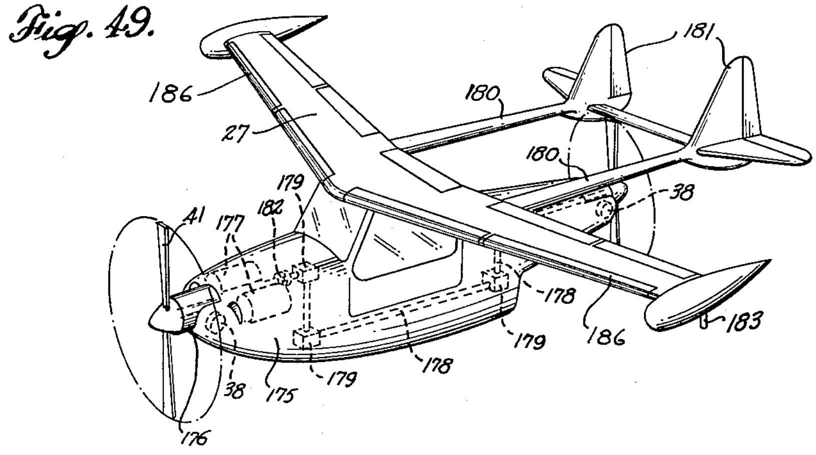
Figure 50:
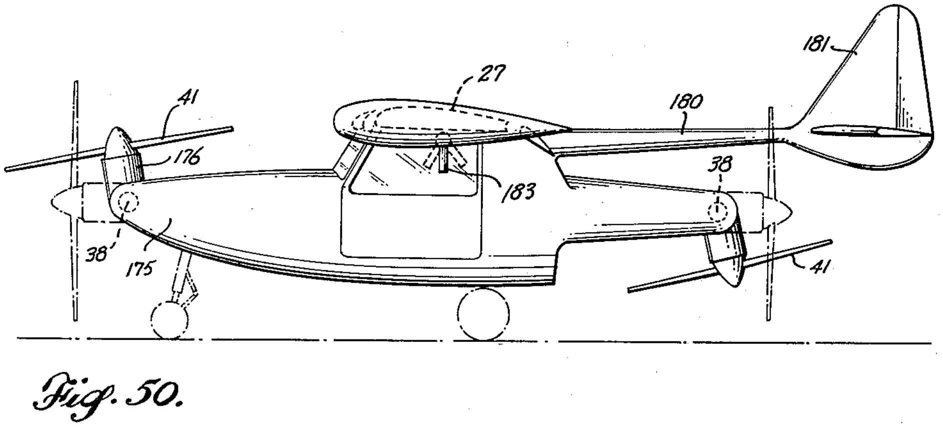

FIGURE 49 is a top perspective of an airplane having tiltable propeller units mounted directly on the fuselage at locations fore and aft, respectively, of the airplane wing, and FIGURE 50 is a side elevation of such airplane.

Figure 51:
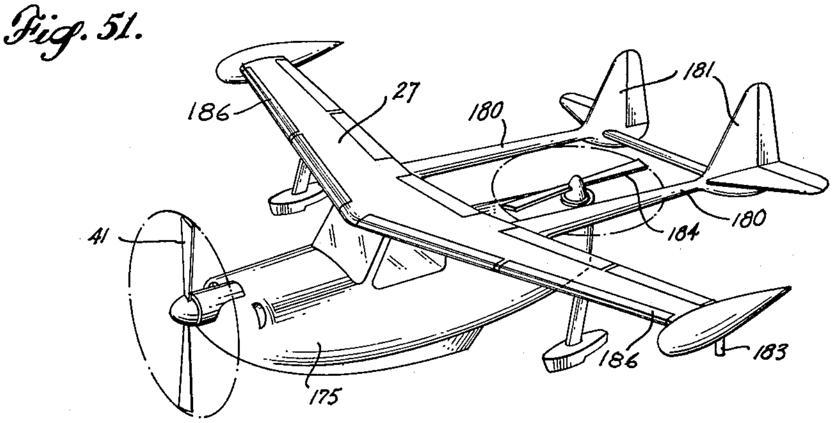
Figure 52:
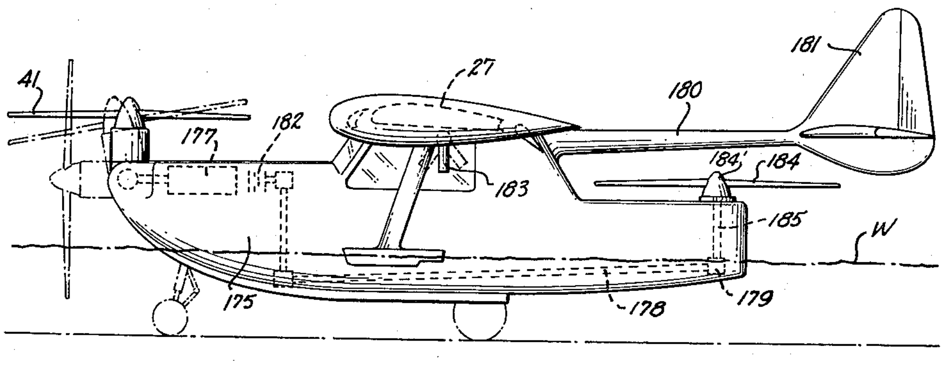

FIGURE 51 is a top perspective of an airplane having fore and aft propeller units mounted directly on the fuselage, the aft propeller unit being of a type different from that shown in FIGURE 49. FIGURE 52 is a side elevation of the airplane shown in FIGURE 51.

In general, the purpose of the present invention is to provide an airplane which can take off and land safely with a very short run, or even vertically, but which will still have an effective flying range, can be operated economically at high speed and will have efficient passenger or cargo carrying ability. It is therefore required that application of the invention to an airplane involve a minimum of structural changes from conventional practice and not add excessive weight to the airplane design. Moreover, as indicated by a comparison of FIGURES 9 and 10, the invention is applicable to airplanes differing widely in size and consequently in power requirements. The invention is shown applied to an airplane of intermediate size in FIGURES 1 to 6, inclusive.

Figure 1:
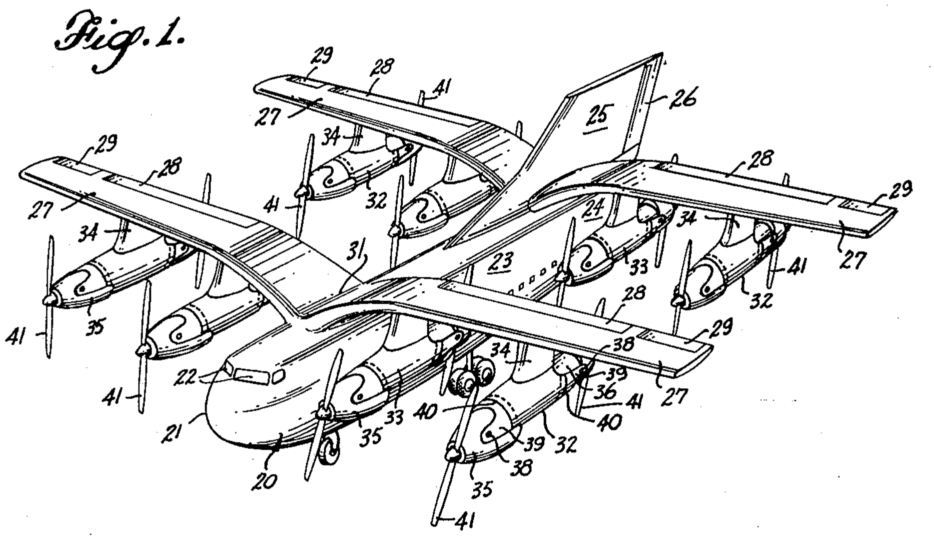
Figures 9, 10:
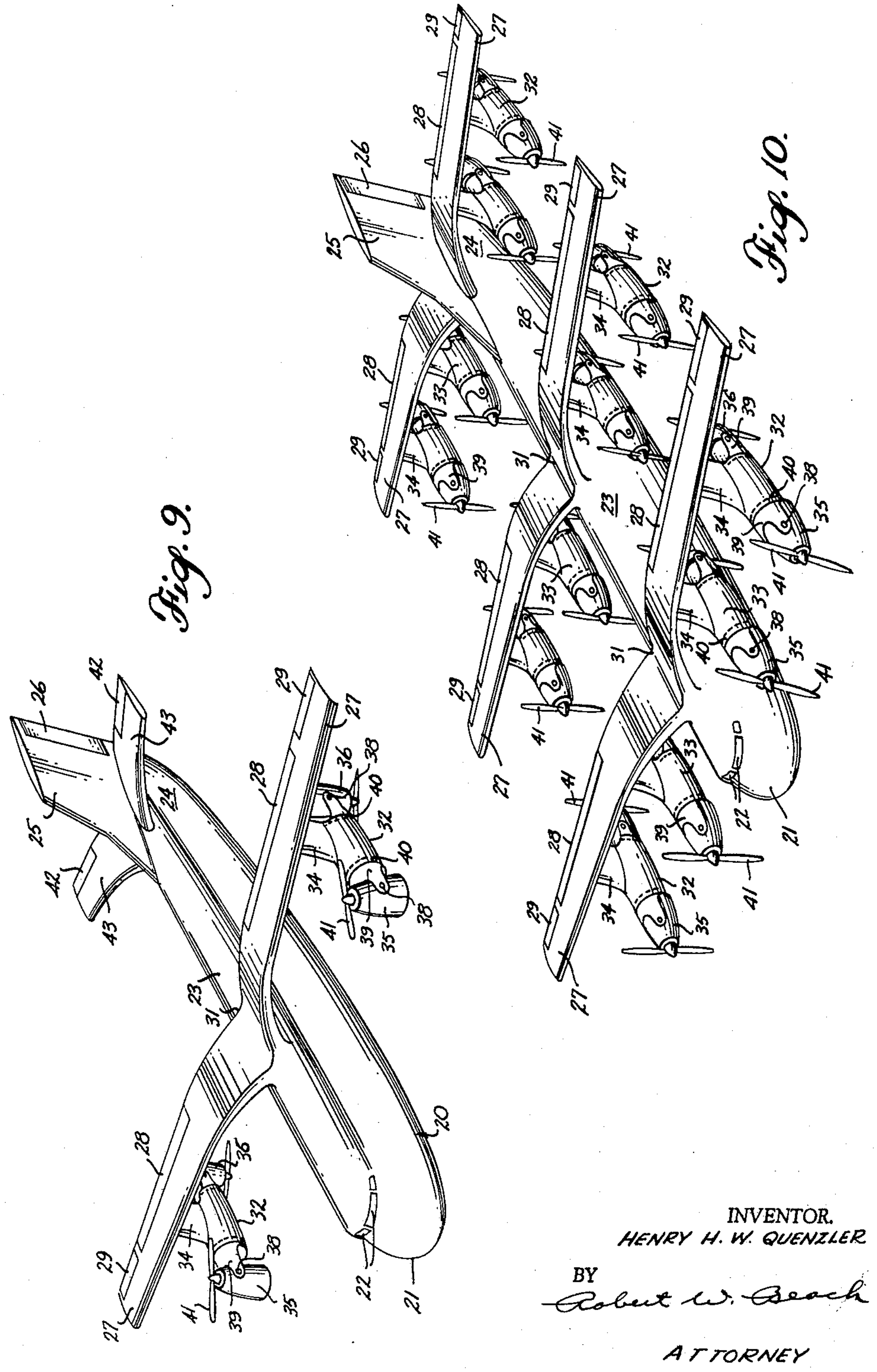
FIGURE 9 is a top perspective of another type of airplane embodying the present invention.
FIGURE 10 is a top perspective of still a different type of airplane embodying the present invention.

As far as the present invention is concerned, the fuselage 20, including the nose portion 21 having windows 22, the center section 23 and the tail section 24, is conventional with respect to the representative types of airplane shown in FIGURES 1, 9 and 10. Also, the vertical fin 25 and rudder 26 on the tail portion of the fuselage are conventional. Likewise, the wings 27 themselves, including flaps 28 and ailerons 29, may be considered conventional in that each pair of wings will be of suitable aerodynamic design and the flaps and control surfaces will be designed and operated to enable the airplane to be flown like a conventional airplane. Only the arrangement of the wings with respect to the center of gravity of the fuselage where more than one pair of wings is provided may differ from conventional practice in respects discussed below.

The general type of the wing mounting is conventional. Thus, each wing installation is preferably of the high wing monoplane type having its central portion 31 attached to the upper portion of the fuselage 20. The power plant installation will be in nacelles 32 shown in FIGURE 9 and in outboard positions in the airplanes of FIGURES 1 and 10. Where two power plant groups are provided for each wing, the second group is mounted in an inboard nacelle 33 in each instance. Such nacelles 32 and 33 are supported in depending positions below the airplane wing by struts 34. Each nacelle 32, or 33, contains a forward power plant 35 and an aft power plant 36 located adjacent to the leading edge and the trailing edge of the wing respectively. If the power plants are of the propeller type, the forward power plant in each case rotates a tractor propeller 41 and the aft power plant rotates a pusher propeller 41. Such power plants may be of the reciprocating piston or turbine type and are arranged to turn the propellers in the same direction relative to the power plants so that the propellers turn oppositely when viewed from a fore or aft position. The propeller torque will therefore be balanced with respect to a nacelle 32, or 33, if the power plants of each pair are being operated at equal speeds.

When the airplane is being operated like a conventional airplane the lines of thrust of all the power plants will be substantially horizontal as indicated in FIGURES 1, 2 and 10. An airplane embodying the present invention should be capable of taking off, flying and landing like a conventional airplane. During such operation the rudder, flaps and ailerons will be manipulated and function in the conventional manner. To enable the airplane to take off and land without a run, or with a run less than would otherwise be required, however, provision is made for enabling the line of thrust of some or all of the power plants to be changed in direction to give a larger or smaller vertical upward thrust component. It is important that such change in thrust component be accomplished without altering any more than absolutely necessary the features of the airplane required for normal flight.

The purpose of mounting the propellers, or power plants, so that their thrust directions can be changed to various directions from substantially horizontal to substantially vertical, is to enable the airplane to rise at a steep angle, or even vertically, without the fuselage, or wing, being tilted excessively. The maximum tilt of the wing chord and longitudinal axis of the fuselage from horizontal would be of the same order as used in conventional airplanes so that passengers in the fuselage would not be appreciably uncomfortable and cargo would not be subjected to excessive sliding stresses. The wing would remain at an angle of attack such as to provide useful lift whenever the airplane is moving forward.

In order to enable the direction of power plant thrust to be changed, each propeller or thrust-producing means is mounted for swinging about a generally horizontal axis extending athwartships of the airplane from a substantially horizontal position through at least 90°, and preferably somewhat more, to a substantially vertical position. Such propeller swinging can be accomplished by mounting each power plant on trunnions carried by a supporting yoke 39. Each propeller can be swung relative to the supporting yoke 39 carrying its trunnions by suitable conventional tilting mechanism, examples of which are found in prior patents.

In the Lapin Patent No. 1,766,390 chain and sprocket drive mechanism is disclosed for tilting a propeller unit about the axis of trunnions mounting it on a yoke. In the Loback Patent No. 2,403,936 quadrants are arranged concentrically with the axis of trunnions of such a unit and the quadrants are swung by motor driven pinions meshing with them. In the Ernest Patent No. 2,403,353 a bevel gear concentric with the propeller unit mounting trunnions is turned by a bevel pinion meshing with such gear and rotated by a flexible drive shaft. In the Hockney Patent No. 2,336,787 a propeller unit is tilted about the axis of its supporting trunnions by a lever arm to which a pull rod or cable is connected. Such mechanism may be considered to be representative for effecting the tilting of the power units of the present device about the axis of trunnions 38 in each instance.

Figure 7:
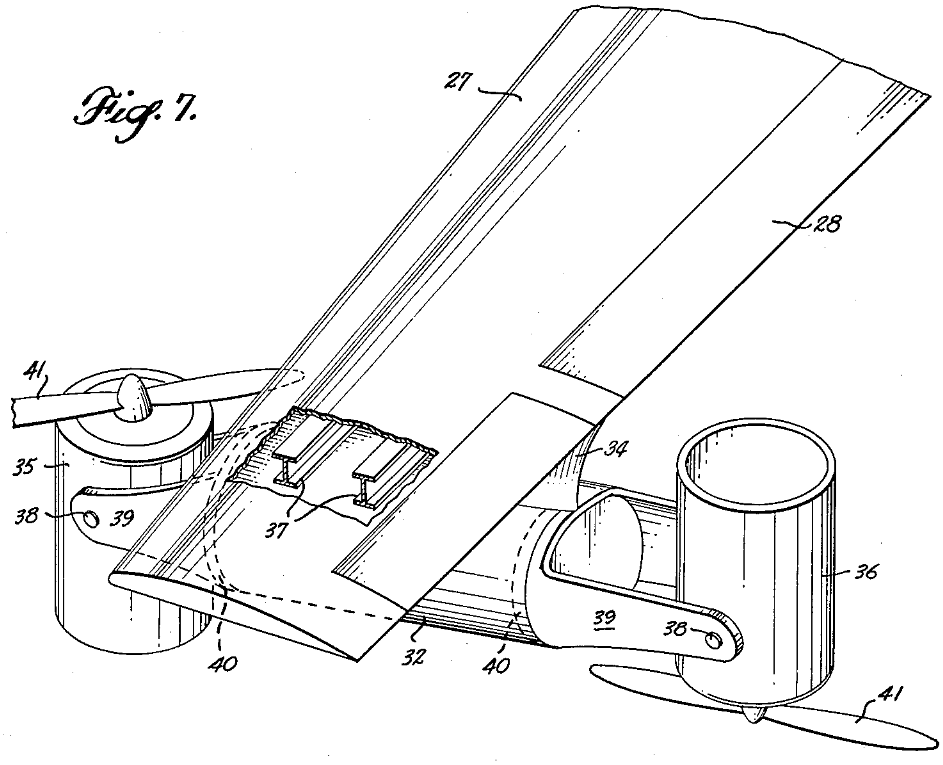
FIGURE 7 is a top perspective of an outboard portion of a wing of an air plane showing the installation of a pair of power plant units, parts being broken away.

In FIGURE 7 the wing 27 is shown as having representative wing spars 37 and the trunnions 38 are shown as being mounted approximately equidistantly fore and aft of these wing spars. When the fore and aft power plants 35 and 36 are swung about their respective trunnions 38 into the solid line positions shown in FIGURE 7, or the dot-dash positions shown in FIGURE 8, the substantially vertical thrusts produced by these power plants will act on the yokes 39 through such trunnions. The yokes, in turn, will transmit the lifting force through the nacelle 32, or 33, and the strut 34 to the wing spars 37. It will thus be evident that the upward thrust produced by the power plants in these positions will be exerted on the same airplane sustaining wing structure as supports the load of the airplane by aerodynamic forces on the wing while the airplane is in normal flight. It is therefore unnecessary to provide any appreciable structural alteration in the wing, or in its attachment at 31 to the fuselage 23, because of the utilization of power plants which can be swung as described above to direct their lines of thrust vertically.

It is, of course, true that during normal flight the aerodynamic forces producing lift on the wing will be distributed throughout the span of the wing, although such lift forces may vary progressively spanwise. It may, therefore, be desirable to produce the vertical lift of the swung power plants at more than one location on the wing, such as afforded by utilizing two pairs of power plants mounted respectively on outboard nacelles 32 and inboard nacelles 33, as shown in FIGURES 1, 2 and 10. If only one pair of power plants is mounted on a wing, as shown in FIGURES 9 and 11, such power plants should be located well inboard from the wing tip so as to reduce the bending stresses in the wing. The strengthening of wing structure which may be required because of the concentrated lifting forces produced by the swung power plants will not be very great.

In normal flight the center of lift chordwise of the wing will shift to some extent but the lift forces are distributed along the entire chord so that the torque of the aerodynamic lifting force about a transverse axis located centrally between the spars 37 at any time is not great. To avoid excessive strengthening of the wing structure it is important that the lift forces produced by the swung power plants not create any appreciably greater torque on the wing structure than would occur during normal flight of the airplane. When the power plants are mounted in pairs, as described, with the fore and aft power plants located approximately equidistantly from the wing spars 37, no appreciable torque will be produced on the wing structure by the lift forces of the swung power plants when they are producing approximately equal thrusts.

In order for the propellers of power plants 35 and 36, below the wing, to operate most effectively when such power plants are swung as shown in FIGURE 7 to direct their lines of thrust substantially vertically, the disks swept by the propellers should be blanketed by the wing 27 as little as possible, if at all. Consequently, trunnions 38, which are below the wing, should be located so that their pivot axes are spaced longitudinally of the airplane from the adjacent edges of the wing 27 respectively, a distance at least approximately as great as the radius of the propeller circle. These trunnions preferably are located in the same relationship relative to the fore and aft propellers respectively.

It is particularly important that the propellers of fore and aft power plants of a pair mounted in tandem be arranged so that the propellers turn in opposite directions when the power plants are disposed with their rotative axes extending substantially vertical. Such counter rotation of the propellers of power plants operating at approximately the same speed will balance the torque applied to the airplane so that it will not tend to rotate about a vertical axis approximately through the center of gravity of the airplane. If the torque of the propellers in each pair is thus balanced it is, of course, immaterial how many pairs of power plants are utilized on the airplane, or how they are arranged as far as their tendency to cause the airplane fuselage to yaw is concerned.

Figure 3:
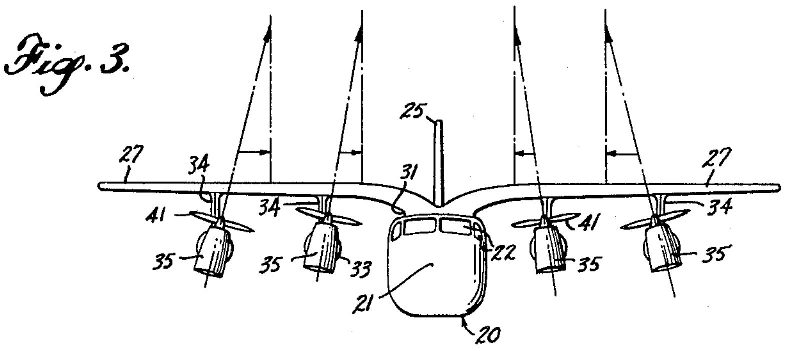
Figure 4:
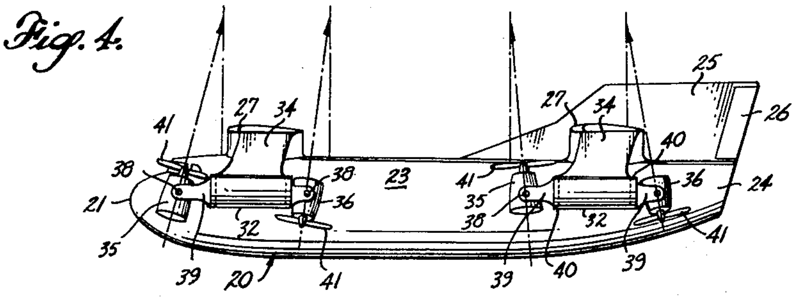

While the location of the power plant pairs spanwise of the wing is not critical, the locations of the nacelles should be such that the power plants will produce thrust in desirable locations for horizontal flight of the airplane. A very important feature of the engine arrangement is that when the thrust lines are substantially vertical they are distributed about the center of gravity of the airplane so as to be balanced both fore and aft and from side to side. Thus, as shown in FIGURE 3 for example, there are equal numbers of thrusts at opposite sides of the longitudinal axis of the airplane and they are located correspondingly on opposite sides of such longitudinal axis. As shown in FIGURES 2 and 4, the upright thrusts are distributed fore and aft so that there are the same number of thrusts forward of the center of gravity as aft of it, and such thrusts are arranged corresponding distances from the center of gravity.

The rear engines on the forward wing are located approximately the same distance from the center of the gravity as the forward engines on the rearward wing when the thrust directions are substantially vertical. Similarly, the front engines on the forward wing are located approximately the same distance from the center of gravity as the rear engines on the aft wing. Consequently, the thrust forces fore and aft of the center of gravity in an upward direction are in balance when the airplane is on an even keel and similarly, the upward thrusts are in balance at opposite sides of the center of gravity laterally of the airplane when the thrust lines are substantially vertical. Such balanced distribution of the thrust-producing means about the center of gravity thus provides excellent stability of the airplane during vertical or steep ascent, or descent, of the airplane when the fuselage is approximately horizontal.

The same principle of balancing thrust lines around the center of gravity is followed in the large airplane of FIGURE 10, in which the central wing is located directly above the center of gravity with the fore and aft engines carried by this wing located equal distances ahead of and behind the center of gravity. Similarly, the engines on the forward wing and on the rearward wing will be arranged with respect to the center of gravity in a manner similar to that described in connection with the airplane shown in FIGURES 1 and 2.

It is preferred that the fore and aft propellers of each pair also be located equal distances from the airplane's longitudinal axis, although this is not essential. In such case, the propeller thrusts will be disposed in rectangular relationship, that is, at the corners of a rectangle the center of which is in substantially vertical registry with the center of gravity. Such rectangular disposition of thrust lines is true of any four of the power plants shown in FIGURE 2 arranged at opposite ends of corresponding diagonals through the vertical projection of the center of gravity. Examples of these are the two inboard front propellers on the forward wing and the two inboard aft propellers on the rear wing, or the two outboard aft propellers on the forward wing and the two outboard forward propellers on the rear wing.

Not only should the engines be distributed symmetrically about the center of gravity of the airplane in the manner described above, but it is also preferred that the thrust directions of the several engines when they are directed substantially vertically upward actually converge substantially to a point at a greater or lesser height directly above the center of gravity of the airplane. Such arrangement of the lines of thrust produces an automatic stabilizing action on the airplane, both in pitch and in roll, when it is being lfted vertically by the upwardly directed thrusts of the engines. To accomplish such disposition of the thrust lines it is necessary for the trunnions 38, about which the axes of the engines tilt, themselves to be tilted somewhat from horizontal, as indicated by the inclination of the engines in FIGURE 3. Such tilt of the trunnions 38 from horizontal will be greater for the outboard engines than for the inboard engines, and the degree of tilt will vary with the distance of the focal point above the center of gravity of the airplane.

In order to enable the height of the focal point above the airplane's center of gravity to be altered the yokes 39 may be rotatively mounted in the collars 40, as indicated in FIGURE 7, about an axis parallel to the longitudinal axis of the airplane. It should be possible to rotate each such yoke through an angle of at least 45 degrees and preferably as much as 90 degrees. These collars can be rotated by an internal ring gear and pinion drive or by any other conventional rotating mechanism. For each particular tilt of a pair of trunnions 38 relative to the horizontal, the thrust line of the propeller unit swingable about the axis of such trunnions will trace a different specific arc in a vertical plane through the longitudinal axis of the airplane as such propeller unit is swung about such axis. Changing the tilt of such trunnions will alter the curvature of such arc and its distance above the airplane. Consequently, corresponding and opposite change of tilt of the trunnions of engines located correspondingly on opposite sides of the airplane's longitudinal axis will have an effect comparable to changing the dihedral angle of an airplane wing.

To enable the thrust line of all engines to converge to a focal point it is necessary for the propellers or engines to be tilted about the axes of the trunnions to the proper angle with respect to the vertical in a fore and aft direction. Thus each engine forward of the center of gravity of the airplane will be swung through an angle somewhat greater than 90 degrees from the horizontal about its trunnions 38, and each engine aft of the center of gravity of the airplane will be swung through an angle somewhat less than 90 degrees. This relationship of the engines is illustrated in FIGURE 4. Moreover, the angle through which each engine should be swung from the horizontal will depend upon the distance of that engine from the center of gravity of the airplane. Thus, as shown in FIGURE 4, the engines farther forward of the center of gravity will be swung through a greater angle from horizontal than the engines closer to the center of gravity, whereas the engines farther aft of the center of gravity will be swung through a smaller angle from horizontal than the aft engines closer to the center of gravity.

Figure 5:
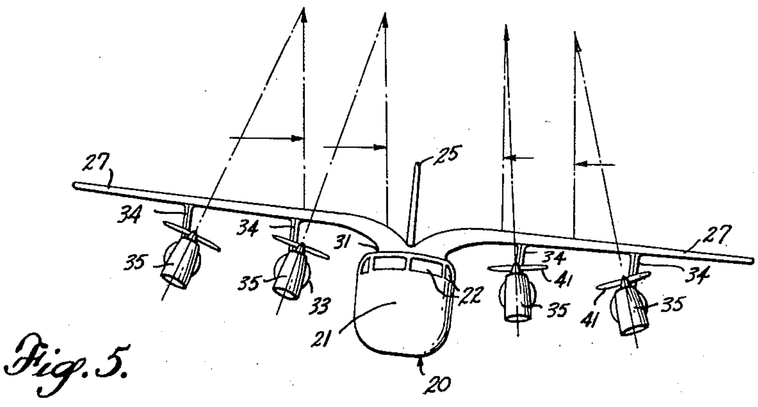

When the upwardly directed thrust lines of the engines all converge to a focal point, if the airplane during substantially vertical ascent should for some reason roll from the horizontal position shown in FIGURE 3 to a position such as shown in FIGURE 5, the vertical components of the lines of thrust of the port engines will be greater than the vertical components of the corresponding starboard engines, so that the port engines will produce a greater net upward thrust than the starboard engines which will tend to oppose further roll of the airplane, and to right it to the position shown in FIGURE 3.

Figure 6:
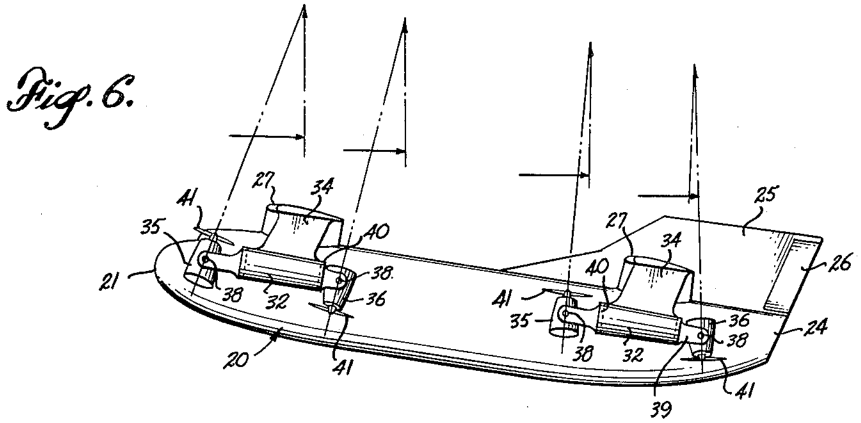

Similarly, if for some reason the airplane should tend to pitch during substantially vertical ascent, so that the nose of the fuselage rises from the position shown in FIGURE 4 to that of FIGURE 6, the vertical components of thrust of the engines aft of the center of gravity will be greater than the vertical components of the thrusts of the corresponding engines forward of the center of gravity, as illustrated in FIGURE 6. The net thrust of the aft engines will therefore exceed the net thrust of the forward engines in a vertical direction so that further rising of the nose will be opposed, and the unbalanced force will tend to raise the tail portion of the airplane so as to restore the airplane to an even keel. Disposition of the engines in the positions shown in FIGURES 3 and 4 will therefore produce inherent static and dynamic stability in the airplane during its substantially vertical ascent.

When the airplane is rising or descending substantially vertically it is possible to effect roll or pitching movements of the fuselage by adjusting the thrust directions of the propellers. The double pivot mounting of the propeller units will enable each propeller to be swung universally, within limits, to alter the thrust direction correspondingly. Thus rolling of the fuselage from a position such as shown in FIGURE 3 could be accomplished by rotating the yokes 39 within the collars 40, those on the port side being rotated so that the thrust lines would extend more nearly vertically, and the starboard engine yokes being turned so that the angle between the thrust lines of these engines and the horizontal would be decreased. Such manipulation would increase the lift on the port side of the airplane so that the starboard wing would dip, but because of the greater horizontal component of the thrust developed by the starboard engines the airplane would skid to port. Alternatively, roll of the airplane with some side slip can be accomplished simply by increasing the thrust of the power plants at one side of the longitudinal axis without change of thrust angle, or decreasing the thrust at the other side, or both.

If the thrust lines of the engines aft of the center of gravity were turned more nearly vertical and the thrust lines of the engines forward of the center of gravity were turned still farther to decrease the angle between them and the horizontal, the greater lifting force on the tail of the airplane would cause the nose to dip and the airplane would be moved rearward because of the greater horizontal component of the thrust of each engine forward of the center of gravity. Alternatively, pitch of the airplane could be effected or altered by increasing or decreasing the thrust of the power plants forward or aft of the center of gravity of the airplane.

The same principle of balancing the upright thrusts both fore and aft of the center of gravity and laterally of the center of gravity is followed irrespective of the number of thrust-producing means employed. While in the airplane of FIGURE 1 sixteen thrust-producing units are provided, the airplanes shown in FIGURES 9 and 11 have only four. The two forward propellers 41 then directed upwardly are located forward of the center of gravity approximately the same distance as the rearward propellers are located rearwardly of the center of gravity when they are swung downward. Also, the two forward propellers are located approximately equidistantly at opposite sides of the longitudinal axis of the airplane, and the two rear propellers likewise are located approximately equal distances at opposite sides of the airplanes' longitudinal axis.

If the airplane has only four power plant units, as do the airplanes shown in FIGURES 9 and 11, it is more difficult to obtain adequate stability and maneuverability during substantially vertical rise or descent of the airplane than in the case of an airplane having a greater number of power plants. In the airplane shown in FIGURE 9, however, the yokes 39 carrying the trunnions 38 are mounted for rotation within the collars 40 about the longitudinal axes of their nacelles as described above in order to enable the upright thrust directions to be adjusted universally within limits.

In the airplane shown in FIGURE 11, however, the four power plants are utilized to produce the necessary vertical thrust force to lift the airplane and other mechanism is provided to effect the necessary control of the airplane in yaw, pitch and roll. Such additional control mechanism is illustrated particularly in FIGURES 12 to 16, inclusive.

In FIGURE 11 the central portion 31 of the single monoplane wing 27 is mounted on the central section 23 of the fuselage 20 in parasol fashion by short struts 31′. The power plant nacelles 32 are suspended below the wings by pairs of struts 34′. The struts of each pair diverge upwardly from the nacelle to the wing to support the nacelle rigidly against swinging toward or away from the fuselage, and against twisting about a vertical axis. Also such divergent arrangement of the nacelle supporting struts distributes the upwardly directed force produced by the upward thrusts of the power plants to locations spaced apart a greater distance spanwise of the wing, and consequently has an effect comparable to substituting inboard and outboard power plant nacelles for the single nacelles with respect to reducing lift force concentrations in the wing during abrupt rise or descent of the airplane.

The forward power plant units 35 and the aft power plant units 36 are mounted in the nacelles 32 by trunnions 38 for coordinated swinging to direct their thrust directions between horizontal and vertical as described above. In this installation, however, the axes of trunnions 38 can not be tilted to different degrees for the purpose of swinging the vertical thrust lines of the power plants in vertical planes disposed transversely of the airplane. The details of the steering turbine 44 shown in FIGURE 11 are illustrated in FIGURES 12 to 15, inclusive. The air intake 45 for the turbine can open forward through the upper portion of the fuselage and the turbine exhaust gases are discharged through the outflow pipe 46. The aft portion of this outflow pipe includes a flaring section 47 which terminates in side branches 48 directed oppositely and a rear branch 49 directed rearwardly.

Within the aft portion of the outflow pipe just forward of the side branches 48 is an upright divider disposed in the central longitudinal plane of the outflow pipe. Swingable deflector plates 51 pivoted to swing about parallel upright axles 52 spaced transversely of the outflow duct are mounted immediately rearwardly of the divider in a position to cooperate with such divider for controlling the flow of exhaust gas from the turbine through the branches of the outflow pipe. Preferably such pivots are located approximately centrally fore and aft of the deflector plates so that the deflector plates can swing between the parallel solid line positions shown in FIGURE 13 and the forwardly convergent positions shown in broken lines in FIGURE 13 and in full lines in FIGURE 12.

Forward of the divider 50 is a swingable duct section 53 which is of substantially the same height as the portion of the duct 46 forward of such swingable section, but is of a width only approximately half as great as the horizontal width of the flared duct section 47. The forward end portion of the swingable duct section has curved walls 54 fitting closely the adjacent portion of the outflow pipe so that all of the turbine exhaust gas will flow into the duct section 53 irrespective of the position in which it is swung. The duct section is guided for swinging by the pivot 55 which not only connects the section 53 to the outflow pipe but projects beyond the outflow pipe as shown in FIGURE 12 to enable the pivot to be rotated for the purpose of effecting swinging of the duct section. The swinging mechanism includes an arm 56 secured to the pivot rod which in turn is connected by pivot 57 to the plunger 58 of a hydraulic piston and cylinder actuator 59.

When the duct section 53 is in the central position shown in FIGURE 12 and the deflector plates 51 are disposed in their forwardly convergent relationship shown in that figure, the flow of turbine exhaust gas through the duct section 53 will be divided equally by the divider plate 50 and the flow of gas at opposite sides of such divider plate will be deflected by the deflector plates 51 to be discharged through the side ducts 48. Since these ducts are directed oppositely the reaction forces produced by the gas jets discharged from these ducts will be equal and opposite so that no control force will be produced by the steering turbine under these circumstances.

If it should be desired to produce a yawing movement of the airplane fuselage to port, liquid under pressure will be supplied to the actuator 59 to move the plunger 58 outwardly for swinging the duct section 53 into the broken line position shown at the bottom of FIGURE 13. Instead of the exhaust gas flow being divided equally by the divider 50, the entire flow will now be projected through the port side duct 48. The reaction of the exhaust gas thus discharged will swing the aft portion 24 of the fuselage to starboard and the nose portion 21 of the fuselage to port. Conversely, if liquid under pressure is supplied to the actuator 59 to move its plunger 58 inward the pivot rod 55 will be rotated to swing the aft end of the duct section 53 into the upper broken line position of FIGURE 13 for discharging the entire exhaust of the steering turbine through the starboard side duct 48. The reaction of the gas thus discharged will swing the rear portion 24 of the fuselage to port, and the forward portion 21 of the fuselage to starboard. If the swingable duct section 23 is swung in one direction a smaller amount from its central position shown in FIGURES 12 and 13, a side thrust of less intensity will be produced to effect yawing movement of the airplane because turbine exhaust gas will be discharged through both side ducts 48, although more gas will be discharged through one of such ducts than through the other.

In each side duct 48 vanes 60 are mounted on horizontal pivots 61 and these vanes normally will be disposed in horizontal positions, as shown in FIGURES 12, 13 and 15, so that exhaust gas will be ejected from the side ducts in horizontal directions. For the purpose of effecting pitching movement of the airplane, the vanes 60 can be turned conjointly about their axes by interconnecting the pivot shafts 61 by chain and sprocket mechanism 62 and interconnecting the chains associated with the opposite side ducts by suitable chain and sprocket and gearing mechanism 63. Such gearing mechanism can be moved controllably by turning the control shaft 64 in one direction or the other. If this shaft is turned in a direction to swing the vanes 60 into positions sloping downwardly and outwardly as shown in broken lines in FIGURE 15, the turbine exhaust gases discharged from the side ducts 48 will be deflected downwardly so that the reaction from these jets will raise the tail of the airplane to reduce its angle of attack. Conversely, if the shaft 64 is turned in the opposite direction so that the vanes 60 are inclined outwardly and upwardly the turbine exhaust gas discharged from the side ducts will be deflected upwardly so that the reaction of such jets will depress the aft portion of the airplane fuselage to increase the airplane's angle of attack.

In FIGURES 11 and 16 roll control mechanism is shown as including an exhaust gas duct 65 through which part or all of the exhaust from a forward engine 35 flows. The outlet 66 of this duct is inclined relative to the axis of the duct, as shown in FIGURE 16. A hood 67 having triangular parallel sides carrying an interconnecting curved side is mounted by pivot 68 on the duct. An operating rod 69 is connected by pivot 70 to one of the sides 67 of the hood so that lengthwise movement of the control rod will swing the hood about its pivot 68 between the solid position shown in FIGURE 16 and the position shown in full lines in FIGURE 11 and in broken lines in FIGURE 16.

When the hoods mounted on the exhaust gas ducts 65 of both engines 35 are in the solid line positions as shown in FIGURE 11, the exhaust gas will be discharged horizontally from the two ducts in opposite directions so that the thrust forces produced by such jets will be directed oppositely and consequently will be balanced. If it should be desired to roll the airplane so that the port wing rises and the starboard wing is depressed, the control rod 69 of the port engine 35 can be moved upwardly to swing the hood of its exhaust gas duct to, or toward the full line position shown in FIGURE 16. When the hood is thus adjusted the exhaust gas jet discharged from the lower end of the duct 65 will not be horizontal but will have a downward component and when the hood is completely retracted will be directed entirely downward as indicated by the arrow shown in full lines in FIGURE 16. The exhaust gas will therefore produce an upward thrust in addition to the thrust of the propellers 41 so that the port wing will be raised causing the starboard wing to be depressed. Conversely, if the control rod 69 for the hood of the exhaust duct 65 on the starboard engine is pulled up, a downward force will be produced on the starboard side of the airplane in a corresponding manner so that the starboard wing will be raised and the port wing will be depressed to effect opposite rolling movement of the airplane.

Instead of altering the thrust directions of the propeller units providing the upward thrust sustaining the airplane when the propeller units are in the positions shown in FIGURE 11, therefore, the steering turbine 44 can be controlled as described to effect yawing or pitching movement of the airplane and the two power plants 35 can be controlled to effect rolling movement of the airplane even though the airplane has no forward movement whatever but is simply rising or descending. It will be understood that such control movements can be effected instantaneously because the steering turbine and the engines are all operating to produce thrust and it is not necessary to start a thrust-producing device whenever it is desired to effect a controlling movement. On the contrary, the thrust-producing jets are simply being directed oppositely to effect a balance, and an unbalanced condition can be created immediately in the manner described above to produce the desired control movement. The degree of control movement produced in any case can, of course, be regulated by the extent to which the appropriate control element, or elements, are moved. By this procedure the control devices can be operated to compensate for any inequality in the thrusts of the power plants producing the lift on the airplane even though the airplane has no forward movement. Moreover, such control can be effected without producing forward movement of the airplane.

In the airplanes of FIGURES 1 and 10, all the wings may be of virtually the same size, shape and construction. Thus, by arranging the engine pairs suspended from the wings symmetrically at opposite sides of the longitudinal axis of the airplane, arranging the wings symmetrically fore and aft of the center of gravity of the airplane and arranging the engine units disposed fore and aft of the center of gravity in symmetrical fashion, the thrust line of each engine when directed substantially vertically will be disposed at a side of the center of gravity of the airplane opposite the substantially vertical thrust line of another engine in a vertical plane extending diagonally of the airplane's longitudinal axis through the center of gravity. Also the two engines in any such vertical plane will rotate oppositely to balance their torques.

Thus if an engine at one side of the center of gravity should fail completely or partially, the engine at the opposite side of the center of gravity in the same vertical plane through the center of gravity can be deenergized or its thrust reduced so as to maintain equal the distribution of engine-produced lift forces fore and aft and transversely of the airplane at opposite sides of the center of gravity, as described above, and to preserve balanced torque conditions. Such deenergiaztion of an opposite engine may be effected automatically, or by action of the pilot after receiving a warning of the engine failure. In FIGURE 17 each engine of a pair of engines on the port forward wing is shown arranged in the same vertical plane through the center of gravity as an engine of a pair of engines on the aft starboard wing. Torque-sensing elements 71 are provided on each engine which are connected by lines 72 to the panel in the cockpit. These lines may be electric wires, hydraulic pressure conduits, or other transmission elements. When the torque of one of the engines drops critically, a warning light 72′ may be illuminated indicating such condition to the pilot, whereupon he can close the throttle 73 shown in FIGURE 18 of the other aligned engine to reduce its torque correspondingly. Alternatively, the signalling lines 72 can be connected to automatic throttle control mechanism, such as a solenoid, for effecting automatic compensating movement of the throttle corresponding to the engine opposite one which has failed partially or completely.

Representative mechanism for effecting coordinated simultaneous tilting of the fore and aft engines of a pair is illustrated diagrammatically in FIGURE 19. Swinging of the motors about their trunnions is accomplished by an electric drive motor 74 which turns shaft 75 extending forwardly from the motor and shaft 76 extending rearwardly from the motor in opposite directions by suitable gearing 77. Ball screws 78 are rotated by the shafts 75 and 76 for the purpose of moving nuts 79 along them to move cables 80 lengthwise for turning drums 81 which are mounted concentrically with the rotative axes of trunnions 38.

Figure 20:
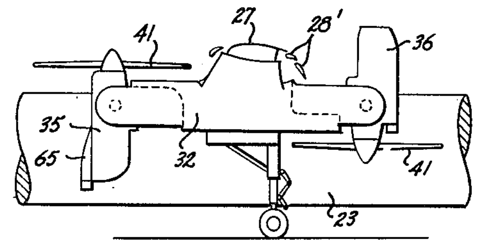
Figure 21:
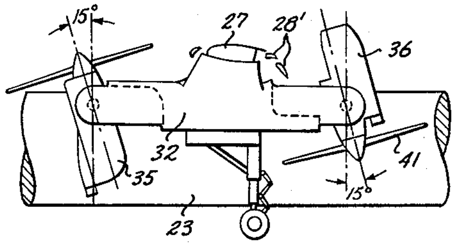

Not only is it important for the lines of thrust of the engines to be in proper balance for stability purposes during susbtantially vertical ascent of the airplane, but it is also important that such balance of vertical forces be maintained during transition of the airplane from a condition where the airplane is sustained solely by the upward thrust of the engines to the condition where the airplane has attained sufficient forward speed so that most or all of its weight is borne by the wings 27. After the airplane has risen a sufficient distance substantially vertically with the engines positioned as shown in FIGURE 20, forward flight is begun. To attain such forward flight it is, of course, necessary to develop a forward thrust component of the engines. Consequently all the engines will be tilted through a small degree simultaneously about their pivots 38, as shown in FIGURE 21, so that the thrust lines of the engines will tilt forward from a substantially vertical direction and each engine will then produce a forward thrust component.

During initial forward movement of the airplane the vertical components of the engine thrusts must still collectively be at least equal to the weight of the airplane to maintain level flight, and preferably will be sufficient to produce further climb of the airplane. Under such propulsive conditions, therefore, the airplane will be operated much like a helicopter in that the airplane wings will produce little or no lift. As the speed of the airplane in a forward direction increases, the airplane will be maneuvered by its normal flight controls to increase its angle of attack as shown in FIGIURE 22 so that the wing or wings can begin to develop lift to assist in sustaining the weight of the airplane.

Under such circumstances the slipstream of the propeller forward of the airplane wing is downward past the leading edge of the wing. Consequently it is important for the propeller to be as much lower than the upper surface of the wing and as far forward of it as practicable. The flow of air produced by the propeller tends to create a negative pressure peak extending downward from the leading edge of the wing as shown in FIGURE 34 which deters creation of useful lift by the wing. In FIGURE 11 especially the trunnions 38 supporting the power plants 35 are located closer to the propellers than to the opposite ends of the power plant units. Consequently the forward tractor propellers 41, in swinging from their horizontal thrust positions to their vertical thrust positions, move rearwardly only a short distance.

When their thrust directions are substantially vertical, as shown in FIGURE 11, such tractor propellers are located forward of and also below the upper surfaces of the wings 27, so as to minimize the adverse effect on the wing lift of the airflows produced by the propellers. Also, the pusher propellers 41 of the aft power plant units 36 will be lowered just a small distance as the front propellers are swung from their horizontal thrust positions into substantially vertical thrust positions to provide maximum ground clearance.

Figure 22:
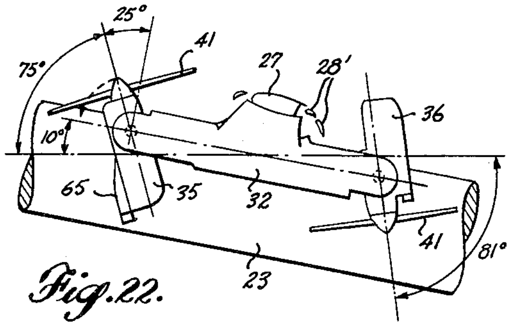

As long as the thrust directions of the propeller units are substantially vertical, as shown in FIGURES 20 and 21, so that the weight of the airplane is supported entirely by the vertical thrusts of the propeller units, it is immaterial what the attitude of the airplane wing is with respect to the fuselage because the wing is not producing any lift and the rate of airplane ascent or descent is sufficiently slow so that the resistance to vertical movement produced by the wing is not very great if the propeller disks are located almost entirely forward or rearward of the wing in each instance. When the axes of the propeller units are tilted forwardly, however, as shown in FIGURES 21 and 22, to initiate forward movement of the airplane, it is very desirable for the wing chord to be generally parallel to the longitudinal axis of the airplane so that aerodynamic forces on the wing can begin to produce lift. As the forward speed of the airplane increases, therefore, increasing positive lift should be produced by the wing so that the support of the weight of the airplane should be transferred gradually from the dynamic thrust of the power plants to wing-created lift.

Where propeller power plants are supported immediately ahead of a wing, however, it is extremely important to locate the power plants properly. Otherwise, a situation may be produced in which the wing portion behind each power plant not only will fail to produce positive lift, but will actually create such a large amount of negative lift as to cause the net aerodynamic force on the entire wing to be in a downward direction, instead of upward. The effect of the propeller slipstream on the wing lift during helicopter-like flight of the airplane is illustrated in FIGURES 27 to 32. FIGURES 27 to 31 show various possible wing types and power plant arrangements and the curves of FIGURE 32 illustrate the wing lift produced by the arrangements of these figures under various conditions.

In order to take advantage of the forward movement of the airplane so as to enable the wing to produce positive areodynamic lift under normal circumstances, very shortly after the propeller units have been tilted to direct their thrust lines as shown in FIGURE 1 the airplane controls should be manipulated to increase the angle of attack of the airplane's longitudinal axis to approximately 10 degrees, as shown in FIGURE 22. For purposes of illustration it is assumed that such a maneuver will be effected at an air speed of approximately 20 knots, which is the left limit of the curves shown in FIGURE 32. Under such conditions the portions of a normal wing 27, such as shown in FIGURE 27, will produce positive lift as represented by the correspondingly indicated curve of FIGURE 32 when a sufficiently high speed has been attained. As is evident, however, from the lowest curve of the graph in FIGURE 32, a positive lift will not be produced by such a wing until a speed of the order of 75 knots has been attained by the airplane.

To increase the wing lift at low speeds it is customary to provide trailing edge flaps on the wings and such flaps 28 are shown in FIGURES 1, 2, 7, 8, 9, 10 and 11, for example. Such flaps are illustrated in downwardly extended position in FIGURE 28. The effect of such downwardly extended flaps on the wing lift coefficient is illustrated by a comparison of the FIGURE 27 lift curve with the FIGURE 28 lift curve in FIGURE 32. Such flaps enable an effective lift to be produced at a true angle of attack of about minus 27 degrees instead of about minus 2 degrees, which means that effective aerodynamic lift will start to be produced at an air speed of approximately 27 knots, instead of approximately 75 knots.

The discussion of FIGURES 27 and 28 applies to the action of an airfoil moving in air undisturbed by propeller wash. The propeller slipstream may have a large or even a controlling effect on the lift produced by that portion of a wing rearwardly of it. The adverse effect of the propeller slipstream is not the result simply of the turbulence of the propeller wash, but of the effect of the slipstream on the true angle of attack of the wing.

When the thrust axis of the propeller unit forward of an airplane wing as shown in FIGURE 10 is vertical, the downwash of the propeller, (the disk of which is completely forward of the wing, does not strike the wing and consequently has no effect on it. When the propeller is tilted forward to some extent to initiate forward flight, such as approximately 15 degrees as indicated in FIGURE 21, it is probable that the downwardly and rearwardly inclined propeller wash still will clear the airplane wing so that it will have no adverse effect on it. As the airplane gathers forward speed and the angle of attack of the airplane's longitudinal axis is increased, as illustrated in FIGURE 22, both propellers will be tilted farther relative to the wing toward horizontal, as indicated in this figure, in order to continue the production of a thrust having a substantial forward component while still having a vertical component sufficiently large to sustain the weight of the airplane.

When the airplane is flying under the conditions illustrated in FIGURE 22, two factors cause the propeller slipstream to influence the lift produced by the wing. The first factor is the tilt of the thrust direction of the propeller through an angle of approximately 25 degrees relative to the chord line of the wing from the relationship of the thrust line to the wing chord line shown in FIGURE 20. Such tilt causes the slipstream of the propeller itself to be directed more toward the wing. The other factor is that as the airplane gains forward speed the true direction of the relative wind with respect to the chord of the wing is the resultant of the slipstream velocity and the forward velocity of the airplane, which will increasingly approach horizontal and consequently be directed more toward the wing as the velocity of the airplane increases.

The location of the propeller unit relative to the wing is very important. FIGURE 29 shows diagrammatically an engine location in which the axis about which the propeller unit turns is approximately in line with the wing chord, so that the propeller itself is above the upper surface of the wing.

When the propeller is tilted forward, as shown in this figure, therefore, the slipstream of the propeller will blow downward and rearwardly to some extent against and otherwise immediately forward of the leading edge of the wing so as to oppose the tendency of the free relative wind to accelerate in its movement over the upper surface of the wing and thereby to produce positive lift. The FIGURE 29 lift curve shows that with the propeller unit mounted in the manner illustrated in FIGURE 29, even where a flap is provided, positive lift will not be produced by the wing until the forward velocity of the airplane reaches approximately 40 knots. Prior to that speed the wing actually produces a large amount of negative lift which must be balanced by the upward component of propeller thrust. Use of propeller thrust for this purpose reduces correspondingly the pay load which otherwise could be lifted by such dynamic thrust.

The adverse effect of the downwardly and rearwardly directed propeller slipstream can be reduced greatly if the axis about which the propeller unit swings is lowered so that the propeller hub is below a plane tangent to the upper surface of the wing and parallel to the wing chord, as shown in FIGURE 30, or means are provided to deter the occurrence of a negative lift concentration at the leading edge of the wing, as shown in FIGURE 31, or both. FIGURE 34 shows the profile of an area of negative lift representative of that which would be produced by the propeller unit arrangement shown in FIGURE 29 during helicopter-like flight. Occurrence of such a negative lift concentration can be deterred by providing a leading edge extension such as shown in FIGURE 36, or by opening a slot in the leading edge portion of the wing as shown in FIGURE 37, or both.

The effect of locating the pivot 38 of the propeller unit well below the wing and of having the axis of such pivot close to the propeller is indicated by the lift curve of FIGURE 32 corresponding to the engine arrangement shown in FIGURE 30. In this case the wing begins to develop useful lift at a forward speed of approximately 34 knots instead of 40 knots and at lower speeds the negative lift produced by the wing is much less than results from the propeller unit location shown in FIGURE 29. On the other hand, the FIGURE 31 lift curve shown in FIGURE 32 indicates the substantial additional improvement in performance which can be obtained by the combination of locating the propeller unit as shown in FIGURE 30, and providing a suitable leading edge extension and slot through the leading edge of the wing. With this type of installation the wing is shown as beginning to produce useful lift at a speed of approximately 29 knots and the negative lift produced by the wing at lower speeds is of much smaller value than where the installation of FIGURE 29, or even of FIGURE 30, is used. Tests have shown that as much as thirty percent more useful lift can be obtained by the use of a leading edge extension and slot as shown in FIGURE 31 than by the installation of FIGURE 30 which has no such extension or slot.

It should be understood that the particular values shown in FIGURE 32 for the resultant relative wind true angle and for the airplane forward speed in transition flight for the various curves are simply representative for a typical airplane. It will be appreciated, however, that the various values can be altered by using wings of different profile, engine units of different power, propellers of different diameter and type, different engine locations and alteration of other design factors. The curves of FIGURE 32 do indicate, however, the relative effect of changing the location at which the propeller adjacent to the leading edge of the wing is mounted and utilizing means for deterring the creation of a negative lift concentration at the leading edge portion of the wing by utilizing a leading edge extension or a slot. The effect will be a great difference in the efficiency of the lift-producing ability of the airplane reflected in the amount of useful load which the airplane can carry. The load-carrying ability of the airplane, is, of course, extremely important.

Figure 23:
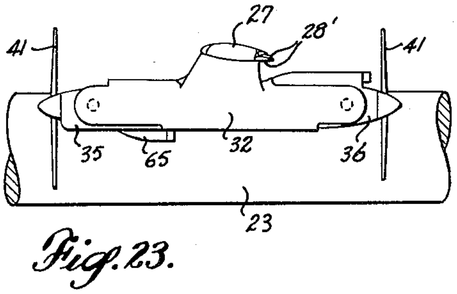
Figure 24:
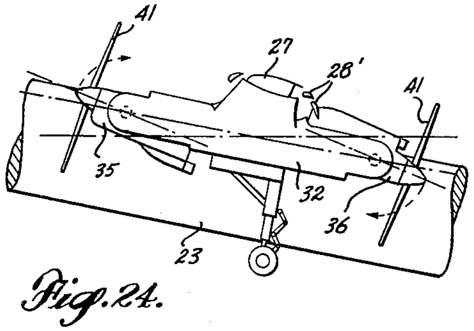
Figure 25:
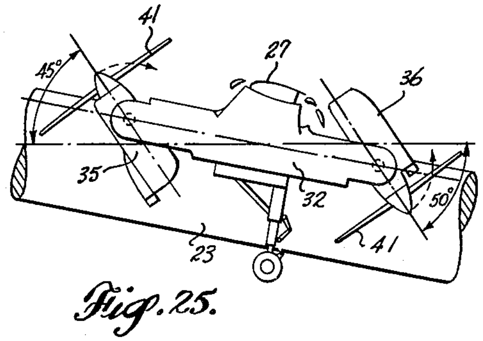
Figure 26:
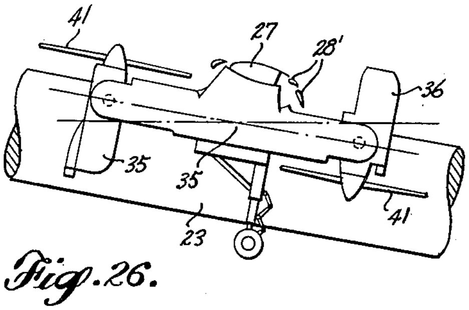

The adverse effect resulting from a high engine location, such as shown in FIGURE 29, has thus far been discussed only with reference to operation of the airplane generally like a helicopter when the principal component of the propeller thrust is vertical and a relatively small component of the propeller thrust is acting in a forward direction to accelerate horizontal flight of the airplane. After the propeller units have been tilted approximately into the positions shown in FIGURE 22, their angle will not be changed until the airplane has gained sufficient speed so that the wing will produce sufficient lift to sustain at least most of the weight of the airplane. Such speed may be in the vicinity of 80 to 100 knots. The fore and aft propeller units of each pair will then be swung conjointly through positions indicated in FIGURE 33 until the thrust directions are substantially horizontal, as shown in FIGURE 23.

During the swinging of the forward propeller unit forward about its axis, the propeller thrust line is directed more nearly toward the airplane wing. The true relative wind with respect to the wing is still the resultant of the propeller thrust and the forward velocity of the airplane. In FIGURE 33 an installation generally of the type shown in FIGURE 31 is shown in which the propeller hub is lower than a plane tangent to the upper surface of the airplane wing and parallel to the wing chord, and the wing is provided with a leading edge extension and slot mechanism. With the propeller of the forward engine tilted an additional 5 degrees from the position shown in FIGURE 22, the principal air movement resulting from the propeller slipstream and the forward speed of the airplane at 100 knots, indicated diagrammatically, will still pass below the wing so as to have relatively little effect on it. The principal slipstream of the propeller is shown as flaring ahead of the propeller because of the air which would be drawn into the propeller disk from the area laterally beyond it by the flow-inducing action of the propeller, and the flow at the discharge side of the propeller disk is shown to be smaller in area than such disk.

When the propeller unit forward of the airplane wing has been tilted 20 degrees farther forward during transition flight, as also indicated in FIGURE 33, the slipstream of the propeller deflected upward by the continued forward movement of the airplane at the same velocity will blow partially onto the airplane wing and will be at a negative angle of attack to the wing chord, thus affecting the lift produced by the wing. With the arrangement shown in FIGURE 30, which does not include any leading edge extension or slot adjacent to the leading edge of the wing, a relatively small positive lift would be produced by the wing, whereas, if the wing had a leading edge construction of a type which would deter the formation of a negative lift concentration zone, a greater positive lift would be created, the improvement in lift depending upon the nature of the extension or slot, or both, provided in the leading edge construction.

If the propeller unit were installed at a high location as shown in FIGURE 29, however, not only would the effect of the propeller slipstream at such tilt angle be for the wing to produce negative lift, but the wing would be located generally in the central portion of the slipstream instead of at one edge of it so that the effect of the slipstream on the wing would be much greater.

As the propeller unit ahead of the wing is tilted still farther forward, such as through an additional angle of 12 degrees, as indicated in FIGURE 33, the slipstream of the propeller will be directed still farther upward and around the airplane wing. With the propeller thrust line thus directed the negative angle of attack of the deflected propeller slipstream would be decreased for a propeller unit location as shown in FIGURE 30 so that even if no leading edge extension or slot through the leading portion of the wing were provided, or if the slot were closed, the wing would still produce a substantial amount of useful lift.

FIGURE 35 shows generally the lift conditions which occur during transition flight between vertical climb effected by the dynamic thrust of the engines and horizontal flight in which the airplane is sustained by the wing. In this comparison it is assumed that following the desired vertical rise of the airplane the thrust directions of the engines will be tilted first to the positions shown in FIGURE 21 and then to the positions shown in FIGURE 22 and held in the latter positions until the speed of the airplane has reached 100 knots. The propellers will then be tilted through the positions shown in FIGURE 33 to horizontal. The curves of FIGURE 35 are labeled to correspond with the types of installation shown in FIGURES 29, 30 and 31, but the propeller thrust tilt direction of these figures only applies between the zero speed line and the 100 knots speed line of FIGURE 35.

As in the curves shown in FIGURE 32, typical numerical values have been assigned to the curves of FIGURE 35 for purposes of illustration. As to these curves, the assumption is that the gross weight of the airplane is 38,000 pounds and the propeller units in combination when their thrusts are directed as shown in FIGURE 21 or 22 can exert an upward component of thrust of 40,000 pounds. Obviously, as the propeller units are tilted from the positions of thrust direction shown in FIGURE 22 to the horizontal positions of FIGURE 23, the vertical thrust component of each propeller unit will decrease. Level flight of the airplane can be maintained, however, if the wing is able to supply sufficient useful lift during such period of transition.

Considering first the portion of FIGURE 35 at the left of the ordinate representing 100 knots, the 40,000 pound horizontal thrust line represents the composite thrust of all of the propeller units in a vertical direction when the thrust lines are directed as shown in FIGURES 21 and 22. The upper curve corresponding to the installation of FIGURE 31 shows that between the speeds of zero and 29 knots the total lift dips below the thrust produced by the propellers because, up to such speed, this type of installation has a negative lift coefficient as shown by the FIGURE 31 lift curve in FIGURE 32. At very low speeds the negative lift force is negligible because of the low velocity of the relative wind over the wing. As the speed increases the negative lift increases until the negative lift coefficient decreases to zero at the speed of 29 knots. Thereafter, the lift produced by the wing is positive, that is, in an upward direction, and the total lift produced by the wing increases more rapidly than in a straight line relationship, both because of the increase in lift coefficient, as shown in FIGURE 32, and the increase in airflow over the wing which also produces greater lift.

The next lower curve of FIGURE 35 corresponding to the installation of FIGURE 30 is lower than the curve corresponding to FIGURE 31 because, as shown in FIGURE 32, the coefficient of lift for this type of arrangement is negative until a speed of 34 knots has been attained, and the negative lift coefficient is greater for the arrangement of FIGURE 30 than for the arrangement of FIGURE 31 at speeds below 34 knots. After the airplane reaches this speed, however, the lift coefficient increases almost as rapidly as the lift coefficient for the arrangement of FIGURE 31, so the rise of this curve also is more rapid than a straight line relationship. Even for this curve it will be seen that the negative lift produced by the wing, which attains a maximum at a speed of about 20 knots, is less than 2,000 pounds, so that the engines produce sufficient thrust to accelerate the airplane from zero speed to 100 knots without loss of altitude. The additional lift force produced by the wing at speeds in excess of 29 knots for the arrangement of FIGURE 31 and 34 knots for the arrangement of FIGURE 30 can be used for increasing the altitude of the airplane.

A different situation exists with respect to the performance of the arrangement shown in FIGURE 29 where the propeller unit is mounted in a comparatively high position relative to the wing and the propeller slipstream flows downward onto the leading edge of the wing, or immediately ahead of it. In this case, as shown in FIGURE 32 and discussed above, the wing lift coefficient is negative until an airplane speed of 40 knots is reached. Because for lower speeds the value of the negative lift component is greater and the speed also is greater, the amount of negative lift produced by the wing will be greater and the total amount of negative lift is shown by the FIGURE 29 lift curve of FIGURE 35 to be about 4,000 pounds. Since the excess of total propeller thrust over level flight lift needed to sustain the gross airplane weight of 38,000 pounds is only 2,000 pounds, either the airplane having the arrangement shown in FIGURE 29 is incapable of maintaining at least level flight within the speed range of 10 knots to 30 knots, or the useful load of the airplane must be reduced 2,000 pounds. Since the useful load of such an airplane would be only about 10,000 pounds a reduction of 2,000 pounds would mean a sacrifice in useful load of approximately 20 percent.

It is assumed that the forward speed of the airplane will remain constant while the propeller units are being tilted from their positions shown in FIGURE 22 to the horizontal positions of FIGURE 23 through intermediate positions such as shown in FIGURE 33. If the wing lift were not influenced by the slipstreams of the propellers, the wing lift would remain constant but the total lift would decrease because the vertical components of the propeller unit thrusts would be decreasing as the thrust lines approached horizontal. As has been discussed, however, the slipstream of the propeller influences the wing lift, especially as it approaches closer to the wing during downward tilting of the thrust line. With the arrangement of FIGURE 31, as the propeller slip stream approaches the wing because of the propeller thrust line tilting, the negative angle of attack is reduced. While the amount of wing lift is decreased by such negative angle of attack the total lift remains adequate to support the weight of the airplane. With the arrangement shown in FIGURE 30 the total lift produced by the wing is not as great but it still will be adequate to support the airplane in level and even climbing flight.

A different situation exists with respect to the arrangement shown in FIGURE 29. It will be evident from FIGURE 33 that the higher the propeller unit is located relative to the wing and the closer the propeller unit is to the wing, the more directly will the slipstream of the propeller impinge upon the wing. Consequently, the slipstream of the propeller will interfere with the undisturbed airflow over the wing when the thrust line has been turned toward horizontal through a much smaller angle. Because the relative wind will blow more onto the wing at a large negative angle when the thrust direction has been tilted to an angle of 70 degrees to the horizontal, as shown in FIGURE 33, the negative lift produced by the portion of the wing in the propeller slipstream will approach equality with the positive lift produced by the rest of the wing as indicated by the FIGURE 29 lift curve in FIGURE 32. While the negative lift angle will have decreased when the thrust line has swung through an additional 20 degrees toward horizontal, as shown in FIGURE 33, the negative lift will be much larger because the entire slipstream of the propeller will be blowing over the wing. The negative lift produced by the portion of the wing in the propeller slipstream will be much greater than the positive lift produced by the rest of the wing, and this condition will still be true after the propeller unit has been tilted toward horizontal through another 12 degrees, as indicated in FIGURE 35.

While the propeller unit is being swung toward horizontal, therefore, from an angle of approximately 70 degrees to horizontal to approximately 38 degrees to horizontal, the arrangement shown in FIGURE 29 will produce a very serious negative lift condition on the portion of the wing on which the slipstream of the propeller forward of the wing is projected. Because propellers of large diameter are required in order to provide sufficient thrust for sustaining the airplane in vertical flight, a very large proportion of the wing will be affected by the slipstream of the propeller so that the net lift of the entire wing will be negative. In fact, as shown by the curve FIGURE 29 lift in FIGURE 35, because of the decreasing vertical component of lift produced by the propeller units during this transition flight the situation is much more serious so that, as shown by the curve, the net lift available during a portion of the transition flight is only 15,000 to 25,000 pounds, whereas the weight of the loaded airplane is 38,000 pounds, and the weight of the airplane empty is 28,000 pounds. During such transition, therefore, even if the airplane carried no useful load it would not be possible for it to maintain level flight.

On the other hand, as soon as the propeller thrust direction is tilted far enough toward horizontal so that the lift coefficient becomes positive, the lift created by that portion of the wing in the propeller slipstream will be greater than the lift produced by that portion of the wing moving through undisturbed air, so that the total wing lift, and consequently the entire lift force on the airplane, will increase rapidly even though the vertical component of the propeller thrust is decreasing rapidly.

It will be seen, therefore, that mounting the engine so that the propeller hub is above the upper surface of the wing when the propeller unit is tilted upwardly, as shown in FIGURE 29, is extremely detrimental and that the addition of a leading edge projection to the wing, or a ventilating slot through the leading portion of the wing, or both, is beneficial to deter the formation of a negative pressure concentration area as illustrated in FIGURE 34. Various leading edge projection and slot mechanisms can be provided for this purpose.

Figure 8:
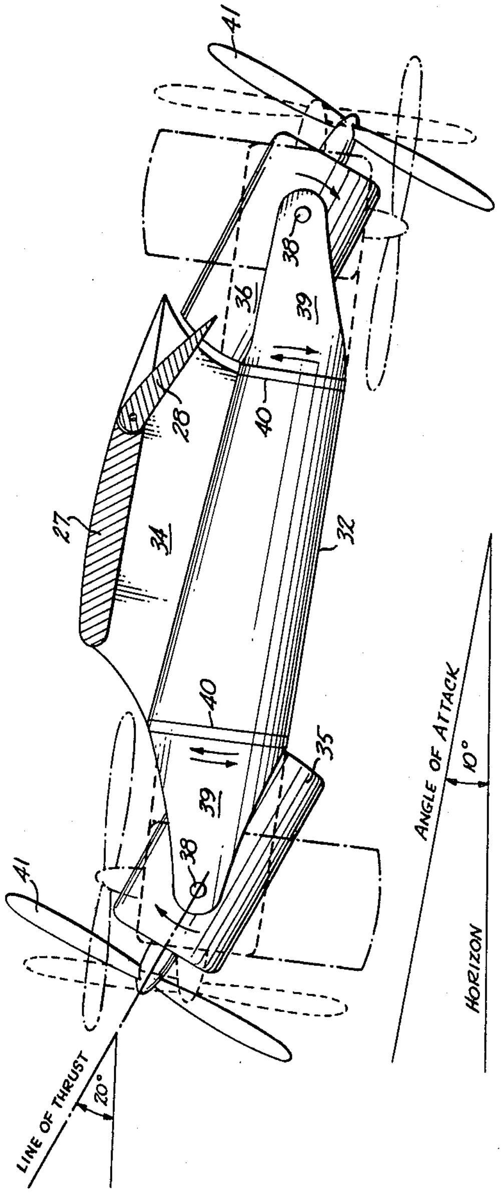
FIGURE 8 is a side elevation of the same structure showing the power plants in a different adjusted position in full lines.

It will be evident from a comparison of the FIGURE 27 and FIGURE 28 lift curves in FIGURE 32, that the provision of a flap is very helpful to increase the lift of wings operating at a negative angle of attack and at low speeds. Consequently, for a practical airplane of the type to which this invention pertains, it is very desirable to provide a flap 28, as shown in FIGURE 8. The flap shown in this figure is simply illustrative because various types of flaps and flap mounting structures are known in the art which differ to some extent in effectiveness, but all of such flaps will improve the performance of the wing in the sense of improving its lift characteristics generally as indicated by a comparison of the FIGURE 27 lift curve and the FIGURE 28 lift curve in FIGURE 32. Moreover, such flaps can be controlled voluntarily, or by an airplane speed sensitive control device, or by drive mechanism coordinated with propeller unit tilting mechanism. Operating mechanism of the last mentioned type is shown in FIGURE 19.

In FIGURE 19 a trailing edge flap 28' of the slotted type is shown, which is driven by the electric motor 74 through gearing 77. Such gearing may drive a clutch 82 which in turn rotates a shaft 83 to drive gearing 83' for turning shaft 84 carrying the lead screw 85 which may be of the antifriction type. A nut on the lead screw will reciprocate the rod 86 which is connected to flap-swinging linkage 87. The clutch 82 may be arranged to be engaged by manual operation of the pilot, or may be connected to a speed responsive control so that the flap can be driven as desired either in synchronism with tilt of the propeller units, or the gearing 77 can be driven by the motor 74 to effect flap adjustment independently of swinging of the propeller units. Alternatively, the clutch 82 can be engaged in response to swinging of the propeller units through a particular selected angle by clutch-energizing mechanism responsive to angular movement of the propeller units. It is evident, however, that the flap 28 or 28' should be in its depressed position whenever the propeller units are tilted through a substantial angle from horizontal position and it may be desirable to have the flaps in depressed position under some circumstances even when the propeller thrust directions are horizontal.

The purpose of an extension on the leading edge of the wing is to deter high speed air flow downward beneath the leading edge to provide a low pressure area, as indicated in FIGURE 34, to create negative lift when the relative wind is approaching the wing in the direction indicated by the arrow W, or at a greater negative angle. A simple form of leading edge projection for this purpose is shown in FIGURE 36 as the baffle plate 88. This baffle plate may be of the flat type being supported for swinging by a pivot 89 along its upper edge from a position shown in solid lines in FIGURE 36 flush with the surface of the wing's leading edge to a position projecting generally perpendicular to a tangent to the wing's leading edge, as indicated in broken lines. This baffle plate is shown as being mounted on the lower portion of the leading edge so that in its extended position it will project directly forward and preferably somewhat downward from the extreme leading edge of the wing 27. Such a baffle plate can be swung between its extended and retracted positions by any suitable mechanism such as the fluid pressure actuator 90 which may be of the pneumatic or hydraulic piston and cylinder type. It will be noted that this baffle plate in its extended position projects outwardly from the surface of the wing approximately at the location where the negative pressure area shown in FIGURE 34 would otherwise be initiated. Because of the obstruction produced by this projection to flow of air downward beneath the leading edge of the wing, air approaching the wing in the direction of the relative wind W will tend to be deflected upward and over the upper surface of the wing instead of forward and downward around the forwardly projecting edge of the baffle plate 88 in its extended position.

The action of the baffle plate 88 in its extended position is to deter movement of air downward at high speed around the leading edge of the wing which otherwise would flow in that manner to create the low pressure area indicated in FIGURE 34. An alternative expedient is simply to destroy the low pressure characteristics of such flow caused by the high velocity of such flow by enabling additional air to flow into this low pressure region from a relatively high pressure region. In FIGURE 37 the leading edge portion of the wing 27 is shown as having a slot 91 in its upper surface normally closed by a slat 92 and a slot 93 in its lower surface normally closed by a slat 94. These slats may be of the inwardly swinging type mounted on the wing by hinges 95 and 96, respectively. Such slats may be swung from their closed positions flush with the upper and lower surfaces of the wing respectively, as shown in solid lines in FIGURE 37, into the open positions shown in broken lines. Such swinging of the slats may be effected by a fluid pressure actuator 97 which may be either a pneumatic or a hydraulic piston and cylinder device. The plunger 98 of such actuator is pivotally connected to links 99 which in turn are pivotally connected respectively to the slats 92 and 94. As the plunger 98 moves into the actuator, the slats will be swung into their open positions so that air can flow from the relatively high pressure area above the leading edge portion of the wing into the relatively low pressure area below the leading edge portion of the wing for the purpose of preventing the formation of any substantial low pressure concentration beneath the wing's leading edge.

In some cases a leading edge extension such as shown in FIGURE 36 alone, or a leading edge slot such as shown in FIGURE 37 alone, may be less effective than a combination of such devices for preventing formation of a low pressure concentration beneath the wing's leading edge. Various types of leading edge extensions and slot arrangements in combination could be provided, examples of which are shown in FIGURES 38 to 40, FIGURES 41 and 42 and FIGURES 43 and 44. In each instance the baffle plate can be in an extended position while the slot is closed, or the baffle plate can be extended and the slot be open. In none of these instances, however, is provision made for the slot being open while the leading edge projection is in its retracted position.

In the arrangement shown in FIGURES 38, 39 and 40, a baffle plate 100 is mounted to swing about a pivot 101 between a retracted position, in which it is received in a wide slot 102 in the lower surface of the leading edge of wing 27 with its lower surface flush with the lower surface of the wing, and a fully extended position shown in FIGURE 39. Such swinging of the baffle plate is effected by a fluid pressure actuator 103 of the piston and cylinder type which may be either pneumatic or hydraulic. The piston rod 104 is connected by pivot 105 to a short lever arm 106. The baffle plate is mounted on the long lever arm 107 which is of U-shape so as to extend around the forward edge of the slot 102 when the baffle plate is in its fully extended position of FIGURE 39.

A slot 108 is provided in the upper surface of the wing 27 which need not be nearly as wide chordwise as the slot 102. The upper slot can be closed by the slat 109 pivotally mounted by a hinge 110 extending along an edge of the slot. The slat is moved between its opened and closed positions by the pneumatic or hydraulic fluid pressure actuator 111 which is pivotally connected to the slat 109 by the plunger rod 112. It is preferred that swinging of the slot-control slat be coordinated with movement of the baffle plate 100. Consequently, energization of the actuator 111 may be effected through a suitable electric circuit including the switch 113. In the arrangement shown, when this switch is closed the actuator will be energized to move the slat 109 to its open position shown in FIGURE 39 and when the switch 113 is open the actuator will swing slat 109 to close slot 108 and hold it in such slot-closing position until the switch 113 is closed again.

For the purpose of closing such switch 113 when the baffle plate 100 is in its fully extended position, a lug 114 is provided on the baffle plate supporting arm which will engage and close the switch when the baffle plate is in its fully extended position shown in FIGURE 39. When the baffle plate is swung from such fully extended position somewhat toward its retracted position, as shown in FIGURE 40, the lug 114 will be withdrawn from the switch 113 sufficiently to allow it to open for effecting slat-closing movement of the actuator 111. The actuator will then hold the slat in position closing slot 108 until the baffle plate 100 has again been moved to its fully extended position.

When the slot 108 is closed it may be desirable for the baffle plate 100 to extend downward somewhat farther than it does when it is in its farthest projected position. If desired, therefore, the baffle plate may have a tab 115 swingably mounted by pivot 116 adjacent to its edge farthest from the baffle plate's supporting pivot 101. An arm 117 projects from this tab which is pivotally connected to one end of a link 118, having its other end pivotally connected to one end of an inner link 119. The other end of such inner link is pivotally mounted on pivot 101. Normally the linkage 118, 119 is urged by leaf spring 120 engaging link 119 to swing tab 115 into a position in edgewise extension of the baffle plate 100. When the baffle plate is swung to the extreme position shown in FIGURE 39, however, the link 119 engages a stop 121 mounted on the wing adjacent to the forward edge of the lower slot 102. The link will engage this stop before the baffle plate 100 has been swung to its farthest projected position and consequently, the baffle plate will be swung farther outward while swinging of the tab will be interrupted, thus causing the baffle plate to be swung relative to the tab.

As the actuator 103 swings the baffle plate 100 from its farthest extended position of FIGURE 39 inward to the somewhat retracted position of FIGURE 40, spring 120 will hold link 119 against the stop 121 so that the baffle plate will swing relative to the tab 115 into the relationship shown in FIGURE 40. In such relationship the tab projects beyond the baffle plate to increase its effective width. In this position the resistance to flow of air around the wing will be somewhat decreased but if the direction of the relative wind has swung somewhat more toward horizontal from the position shown in FIGURE 34, the baffle plate will still deter the creation of substantial negative lift. As the actuator 103 swings lever arm 106 to move the baffle plate toward the retracted position shown in FIGURE 38, the tab 115 and linkage 118, 119 will be held in the relationship to arm 107 shown in FIGURE 40 by the spring 120. Such tab and linkage will therefore remain in such relationship to the baffle plate until it has again been swung outward from the wing beyond its position shown in FIGURE 40.

In the baffle plate arrangement shown in FIGURES 41 and 42 the baffle plate 121 is swingably mounted by pivot 122 on a somewhat curved rack bar 123 extending generally chordwise of the wing. This rack bar is guided for lengthwise movement by rollers 124 engaging the lower edge of the rack bar and an upper roller 125 engaged in a groove or with a shoulder spaced upwardly from the rollers 124. Movement of the baffle plate is effected by a gear 126, the teeth of which are in mesh with the teeth of rack bar 123. Control over the fore and aft movement of the baffle plate is therefore effected by rotation of shaft 127 on which gear 126 is mounted. A baffle plate of the type shown in FIGURE 42 can be projected any desired degree beyond the leading edge of the wing 27 from the position shown in FIGURE 41. When the baffle plate has been moved into its fully extended position it may be swung about pivot 122 relative to the rack bar 123 to open a slot between the trailing edge of the baffle plate and the leading edge of the wing, as indicated in broken lines in FIGURE 42. Such swinging of the baffle plate relative to the rack bar can be effected by a pneumatic or hydraulic actuator 128 of the piston and cylinder type pivotally connected between the baffle plate and the rack bar. Control of such actuator can be effected manually or by closing of switch 129 in a suitable control circuit. This switch is closed by engagement with it of a lug 130 mounted on the inner end of the rack bar. When the rack bar is moved by gear 126 to its fully extended position, therefore, the actuator 128 will be energized automatically to swing the baffle plate into the broken line position shown. Slight retracting movement of the rack bar will withdraw the lug from switch 129 so that the actuator 128 will swing the baffle plate back again to the slot-closing position shown in full lines in FIGURE 42.

In the arrangement shown in FIGURES 43 and 44 the baffle plate 131 in retracted position closes the slot 132 in the lower surface of the wing generally similar to the arrangement shown in FIGURES 38, 39 and 40. In this instance the baffle plate is mounted on arm 133 which is pivotally supported by shaft 134 on the wing. Projection and retraction of this baffle plate can be effected by the fluid pressure actuator 135 connected to the arm 133 by pivot 136. In this installation two upper slots 137 are provided in the upper surface of the wing 27 which may be opened to enable air to flow through them and slot 132 by retraction of slats 138 which are mounted on hinges 139 extending along the edges of such slots. Movement of the slats 138 is effected by the fluid pressure actuator 140 which may be of either the hydraulic or the pneumatic type of piston and cylinder device. The piston rod 141 is connected to the slats 138 by links 142.

The actuator 140 is energized by mechanism including an electric circuit in which switch 143 is connected. This switch is closed by engagement with it of lug 144 projecting from the portion of arm 133 adjacent to shaft 134. When the actuator 135 projects the baffle plate 131 into its farthest projecting position, the lug 144 moves into engagement with the switch 143 to close it, as shown in solid lines in FIGURE 44. Actuator 140 is thereby energized to pull rod 141 and links 142 downward for swinging slats 138 inward to the position of FIGURE 44 opening slots 137. If, subsequently, actuator 135 should be energized to retract baffle plate 131 somewhat from the solid line position to the broken line position, the lug 144 would be withdrawn from engagement with the switch 143 so that the actuator 140 would return the slats 138 to their closed positions flush with the upper surface of the wing 27, as shown in FIGURE 43.

While in the discussion of the various actuators shown in FIGURES 38 to 44, inclusive, they have been designated as fluid-actuated actuators, they could be of the electric solenoid type, if desired. Moreover, other types of operating mechanism could be substituted for one or more of the several actuators because the important consideration is that the projecting baffle plate and the slot-closing slats be coordinated in their operation, as described, to afford greatest deterrent to creation of a low pressure concentration area beneath the leading edge of the airfoil as shown in FIGURE 34.

During transition flight the fore and aft propeller units of each tandem pair are swung conjointly, as shown in FIGURES 21, 22 and 23. After the airplane has gained appreciable forward speed, however, the lines of thrust of the propeller units will not be at the same angle to horizontal, but the angle between the thrust line of each forward propeller and horizontal will be less than the angle between the thrust line of a rearward propeller and horizontal by an angle of the order of 6 degrees. Thus, in FIGURE 22 the tilt angle of the forward propeller unit is shown as being 75 degrees to the horizontal, whereas the tilt angle of the aft propeller unit is 81 degrees to horizontal. In FIGURE 33 when the tilt angle of the forward propeller unit is shown as 70 degrees the tilt angle of the aft propeller unit is 76 degrees; when the tilt angle of the forward propeller unit is 50 degrees the tilt angle of the aft propeller unit is indicated as being 56 degrees; and when the tilt angle of the forward propeller unit is indicated as being 38 degrees the tilt angle of the aft propeller unit is indicated as being 42 degrees. While the particular difference between the tilt angle of the forward propeller and the tilt angle of the rearward propeller may differ somewhat, depending upon design and flight condition, the degree of difference indicated is representative and during transition flight the tilt angle of the forward propeller should be less than the tilt angle of the aft propeller in each tandem pair.

The blades of the propellers 41 are not articulated at their roots, but are connected to the hub in rigid cantilever fashion. When the airplane gains appreciable forward speed the air flowing into the propeller disk moves into it in the direction of the relative wind, as indicated in FIGURE 33, instead of perpendicular to the propeller disk. The effect of such entering air direction is to cause the center of thrust produced by the propeller to move forward from the propeller hub a distance equal to approximately ten percent of the propeller radius. Such shift of the center of propeller thrust from the axis of rotation of the propeller occurs in both the forward and rearward propellers and the shift is greater for greater tilt angles of the propellers from horizontal and for greater velocities of the airplane. Because of the forward shift of the thrust line of both fore and aft propellers the moment arm between the center of gravity of the airplane and the forward propeller thrust line is about ten percent of the propeller diameter greater than the moment arm between the effective thrust line of the aft propeller and the center of gravity of the airplane.

In order to maintain the moments of the thrusts of the fore and aft propellers about the center of gravity of the airplane in balance, the vertical component of thrust of the forward propeller can be reduced relative to the vertical component of thrust of the aft propeller by decreasing the tilt angle of the forward propeller. During progressive swinging of the propeller units from the positions shown in FIGURE 21 to the positions shown in FIGURE 23, therefore, the tilt angle of the forward propeller unit axis should be less than the tilt angle of the rearward propeller unit tilt axis. Such difference in tilt angle should be increased as the forward speed of the airplane increases. As the angle of attack of the longitudinal axis of the airplane is increased from FIGURE 21 to FIGURE 22 by an angle of 10 degrees, the forward propeller unit is shown to have been tilted through 10 degrees relative to the longitudinal axis of the airplane to maintain its tilt angle relative to the horizontal and consequently, its horizontal and vertical thrust components, constant. On the other hand, the aft propeller unit has been tilted through only 4 degrees relative to the nacelle so that the tilt angle of its axis relative to horizontal is 81 degrees making the total difference in tilt angle of 6 degrees. Such difference is increased gradually to this value as the speed of the airplane increases.

As the two propellers continue to tilt toward horizontal the vertical components of their thrusts will decrease and the effect of the forward movement of the airplane will decrease so that the difference in title angle should be reduced progressively until both propeller units are disposed with their axes horizontal. It has been indicated in FIGURE 33, therefore, that while the difference in tilt angle could still be about 6 degrees when the tilt angle of the forward propeller is 50 degrees, the difference in tilt angle may be reduced to 4 degrees when the tilt angle of the forward propeller unit axis has decreased to 38 degrees. By thus decreasing the tilt angle of the forward propeller unit axis more rapidly than the tilt angle of the aft propeller unit axis during transistion, the creation of a moment on the airplane about its center of gravity tending to increase the pitch of the airplane toward stalling condition is avoided.

In the representative mechanism shown in FIGURE 19 for effecting simultaneous tilting of the fore and aft engines of a pair, suitable movement compensating mechanism 76' is interposed in the drive shaft 76 between the front and rear power plant tilting devices to effect the desired tilt angle coordination between the two propeller units of the pair in the relationship discussed above. For any given tilt angle of one propeller unit, therefore, the other propeller unit will have a definite tilt angle relative to the nacelle and hence relative to the longitudinal axis of the airplane whether the tilt angles are being decreased during transition flight from vertical ascent to cruising condition, or incerased during descent from cruising condition to vertical landing, or are being maintained constant within an intermediate range during steep ascent or steep descent of the airplane.

As has been mentioned previously, in order to obtain sufficient dynamic lift to raise the airplane vertically propellers of quite large diameter are required. If the airplane is not required to take off vertically because a short runway is available, an accelerated takeoff is possible by tilting the thrust directions of the propeller units from horizontal only part way toward vertical, such as approximately 50 degrees to the horizontal when the longitudinal axis of the airplane is at an angle of attack of 10 degrees, as shown in the intermediate position of FIGURE 3. Under these circumstances also, it is very important that the propeller unit be located low enough to prevent the creation of a strong downwash on the leading portion of the wing which would cause a disastrous negative lift. If upward tilting of the propellers would produce a considerable negative lift on the wing, such tilting would be less advantageous than if the thrust directions of the propellers remained horizontal.

After cruising altitude has been reached great economy of operation can be effected by stopping one engine of each pair and feathering its propeller while cruising speed is maintained by increasing the thrust produced by the other propeller, which consequently will operate at higher efficiency. Actually, therefore, half of the power plants are sufficient to operate the airplane under normal flying conditions and the other power plants would normally be used for a short period of time during takeoff, or for hovering, and during landing. Various types of power plants and power plant arrangements could be used for driving the propeller units.

In FIGURES 45 and 46 an arrangement is shown in which the engines themselves driving the propellers are not tilted when the thrust directions of the power plant units are altered. In this instance the drive shafts 143 for the propellers 41 are turned by bevel gear drives 144 driven by a cross shaft 145, the axis of which coincides with the axis of trunnions 33 supporting the propeller units for tilting. The cross shaft 145 in turn is driven by bevel gears 146 turned through a gear box 147 by an internal combustion turbine engine 148. The propeller unit is turned by a worm and gear drive 149, the worm of which is driven by the motor 150. Such motors for the fore and aft propeller units of each pair may be of the hydraulic type synchronized by valve mechanism 150′ controlling flow from a source of liquid under pressure so as to effect tilting of the propeller units about their respective axes to dispose the forward thrust line more nearly horizontal than the aft thrust line when the thrust lines are in intermediate positions as previously explained. The forward engine is shown as having an air intake 151 and the rear engine has a forwardly directed air intake 152. The exhaust gas discharge duct 153 of the forward engine and the exhaust gas discharge duct 154 of the rear engine are connected to the common discharge duct 155.

The engine arrangement shown in FIGURES 47 and 48 would be used for a larger airplane in which four gas turbine engines 156, 157, 158 and 159 are arranged in a cluster in the central portion of a nacelle 160 supported from the airplane wing by struts 34′. To increase the dependability and efficiency of the engine installation, the forward engines 156 and 157 are interconnected by a gear box 161 and the rear engines 158 and 159 are interconnected by a gear box 162. The gear boxes 161 and 162 are then themselves interconnected by a shaft 163. Shafts 164 extend fore and aft from the gear boxes to locations adjacent to the propellers 41 and are connected to drive bevel gearing 165 for turning the individual propeller driving stub shafts 166. In case of an engine failure both fore and aft propellers will still be driven by three engines for takeoff and landing and during cruising of the airplane the shaft 163 could be driven by any two of the engines.

In this installation also, the engines are mounted stationarily and the propeller units are tilted about the axes of trunnions 38 relative to the drive shafts 164. The bevel gearing will be concentric with the stub shaft trunnions and will be enclosed in a gear casing 167. Each gear casing carries a gear quadrant 168, the gear arc of which is concentric with the axis of the trunnions. A worm 169 meshes with the gear quadrant 168 and is mounted on a drive shaft 170. The fore and aft drive shafts are connected by gearing in a gear box 171 which is driven by a motor 172.

During normal flight both fore and aft propellers 41 would be turned simultaneously because the propeller driving shafts 164 are positively interconnected through the gearing 161 and 162 and the connecting shaft 163. Either propeller could, however, be loaded more heavily by adjusting the propeller pitch to increase the pitch of the propeller to be loaded and decreasing the pitch of the other propeller. Also, the gearing 161 and 162 should either interconnect positively all of the engines 156, 157, 158 and 159 to turn in synchronism, or such gearing could include overrunning clutches so that any one or more of the engines not delivering power would remain idle and the other engines would drive the gearing. In either case, each engine would supply power which would be transmitted to both propeller units through shafts 164.

As has been explained previously, it is desirable for the thrust axis of the forward propeller unit to be more nearly horizontal than the thrust axis of the rear propeller unit when the thrust directions are in intermediate positions, such as from about 30 degrees to horizontal to 80 degrees to horizontal. The difference in inclination to horizontal may be as much as 6 degrees and the relationship should be the same for any particular positions of adjustment, whether the thrust directions are being maintained without change such as to effect takeoff of the airplane with a short run, or during swinging of the propeller units to move the thrust directions toward horizontal or toward vertical positions. The proper coordination of thrust directions of the front and rear propeller units can be effected by appropriately designing the gearing 171 interconnecting shafts 170.

As has been discussed, the propeller units are suspended from a high monoplane wing in nacelles. In FIGURES 49 and 50 an arrangement is shown in which the nacelle mounting the propeller units takes the form of a fuselage 175 of a small airplane depending below the wing 27. In this instance, also, the engines are mounted in stationary positions and only the propellers 41 and housings 176 for the propeller drive shafts swing about the axis of trunnions 38. The engines 177 are connected to the propeller driving stub shafts by bevel gear drives and such stub shafts may be swung by worm and quadrant drives similar to those discussed in connection with FIGURES 45 to 48.

In the engine arrangement shown, the two engines 177 are located adjacent to the forward propeller unit and the aft propeller unit is driven by these same engines through connecting shafting 178 and bevel gearing units 179. The aft propeller 41 located between the rearwardly extending outrigger booms 180 carrying the empennage 181 will be driven in synchronism with the forward propeller unit by such shafting and gearing. After the airplane has reached cruising altitude, however, and the propeller units have been tilted from the positions shown in FIGURE 50, in which their thrust directions are principally vertical, into the horizontal positions shown in broken lines, the clutch 182 can be disengaged so that, until the airplane is ready to land, it will be propelled only by the forward propeller. Except for takeoff and landing, therefore, the shafting 178 and gearing 179 will not be operating and consequently will be subjected to very little wear.

The theory of operation of the installation shown in FIGURES 49 and 50 is similar to that of the aircraft described above. The installation of FIGURES 49 and 50 has the further advantage, however, that it is possible to locate the fore and aft propellers respectively farther forward and farther rearward of the wing to reduce the adverse effect of the forward propeller slipstream on the wing without excessively heavy structural supports for the propeller units and while maintaining the propeller units at substantially equal distances fore and aft of the wing.

The airplane of FIGURES 49 and 50 can be maneuvered to alter the pitch of the airplane by changing the relative pitches of the propellers 41. Thus, if the pitch of the forward propeller is increased and the pitch of the rearward propeller is decreased during substantially vertical ascent or descent of the airplane, the nose of the airplane will be tilted upwardly. Conversely, if the pitch of the forward propeller is reduced and the pitch of the rearward propeller is increased, the airplane will be nosed downward. The airplane cannot be maneuvered either in roll or in yaw, however, by varying the thrust of the propellers. Also, alteration of the propeller thrust cannot deter rolling or yawing movement of the airplane during substantially vertical ascent or descent.

Supplemental controls to maneuver or stabilize the airplane in pitch and yaw during substantially vertical flight can be provided in the form of air jets 183 projecting downward from the opposite tips of the airplane wing 27. Such jets can be supplied with air under pressure bled from the compressors of the engines 177, if such engines are of the gas turbine type driving compressors. Alternatively, air for such jets can be supplied by an auxiliary compressor driven by such engines. To effect roll control or stabilization, air can be ejected vertically downward by the nozzles 183 and if the jet ejected from one nozzle is weaker than the jet ejected from the other, the airplane will roll toward the weaker jet side. The nozzles 183 can be mounted on pivots swingable about axes extending athwartships of the aircraft and if the lower end of the nozzle on one wing tip is swung forward and the lower end of the nozzle on the other wing tip is swung rearward, the airplane will yaw toward the side of the forwardly swung jet nozzle. By manipulating the intensity and direction of the jet nozzles 183, therefore, and varying the relative thrust of the propellers 41 when their thrust directions are substantially vertical, as shown in FIGURE 50, the airplane can be kept on an even keel or maneuvered as desired during substantially vertical ascent or descent of the airplane.

The general arrangement of the propellers in the airplane shown in FIGURES 51 and 52 is similar to such arrangement in the airplane of FIGURES 49 and 50. In this instance, however, the airplane is of the amphibian flying boat type and consequently the aft propeller can not be mounted to swing downward about a horizontal axis from a position corresponding to that of the aft power plant in FIGURES 49 and 50. On the contrary, the aft propeller 184 is mounted on the upper end of stub shaft 185 and this stub shaft can not be tilted to alter the thrust direction of this propeller. Since the engine installation and drive shafts extending from it can be generally the same as in the airplane of FIGURES 49 and 50, however, the same numerals have been applied to corresponding parts and the detailed description of such parts need not be repeated.

In FIGURE 52 the airplane is shown floating in the water at the water line W. It is evident that the forward propeller 41 cannot be tilted so that its thrust line is horizontal while the airplane is floating in this manner because the propeller blades in their lower positions would strike the water. The thrust direction of the propeller can, however, be tilted forward sufficiently to provide a substantial horizontal component, as well as an upward component, which would both effect forward movement of the airplane and tend to elevate the nose of the airplane to effect propulsion over the water in a nose-high attitude which would not be particularly objectionable. During take-off the thrust direction of the forward propeller should be substantially vertical corresponding to the thrust direction of the aft propeller 184. Since both of these propellers are driven by the same power plant installation, preferably are located substantially equal distances fore and aft of the airplane's center of gravity, respectively, and preferably are of the same size, the thrusts produced by such propellers would be substantially equally effective if the pitches of the two propellers were the same. Actually, for take-off the forward propeller could be tilted slightly from vertical as shown in one broken line position so that this propeller would exert a small forward thrust component. The airplane would thus move forward slowly during take-off so as to reduce the suction effect of the water.

During substantially vertical ascent of the airplane the air jet nozzles 183 can be operated to effect roll or yaw of the airplane as described in connection with the airplane shown in FIGURES 49 and 50. When the airplane has reached an altitude sufficient to change the direction of movement to horizontal, the thrust direction of the forward propeller unit can be tilted gradually toward the horizontal position shown in broken lines in FIGURE 52 and in solid lines in FIGURE 51. During such transition movement, in order to keep the vertical thrust fore and aft of the airplane's center of gravity balanced, the pitch of the aft propeller 184 can be reduced progressively to decrease the upward thrust produced by this propeller. Such pitch reduction will not cause this propeller to over-speed, however, because it is positively connected to the engines 177 which drive both the fore and aft propellers.

As the thrust direction of the forward propeller tilts farther toward horizontal, the horizontal thrust component will increase in value and if the propeller speed does not change the amount of horizontal thrust component will increase generally correspondingly. Actually, as the forward movement of the airplane accelerates and the pitch of the aft propeller 184 is decreased, the pitch of the forward propeller 41 should be increased to increase the loading on it. Any suitable conventional variable pitch propeller having pitch changing mechanism in the hub 184′ can be used for this purpose. Finally, when the wing 27 has developed sufficient lift to support the airplane the rear propeller 184 will have been feathered and the forward propeller will be producing only forward thrust. At this time the clutch 182 can be disengaged so that the entire rear propeller drive system 178, 179, 185 will be deenergized and rotation of the propeller 184 will be discontinued. Wear on the shafting 178 and the gearing 179 will thus be minimized and the forward propeller will provide adequate thrust for propelling the airplane during cruising.

The airplane shown in FIGURES 49 and 50 may be operated during cruising in similar fashion by disengaging clutch 182 so that the drive shafting 178 and gearing 179 for the aft propeller will not be driven and such aft propeller can be feathered. Also, the wings 27 of both airplanes are shown as being equipped with trailing edge flaps and leading edge extensions and/or slots for the purpose of cooperating with the tilting forward propeller unit to reduce the adverse effect of the forward propeller slipstream on the aerodynamic lift produced by the wing 27 during transition from substantially vertical flight to horizontal flight, or during take-off of the airplane from a short runway at a steep angle of climb.

In order to provide better roll damping for the airplane at slow speeds and at high angles of attack it is desirable to provide automatic slots 186 on portions of the leading edge of the wing not directly behind a propeller unit. Such automatic slots are particularly desirable on outboard portions of the wing and such automatic slots are shown in the airplanes of FIGURE 11, FIGURES 49 and 50 and FIGURES 51 and 52.

I claim as my invention:

1. In an airplane, a wing, an elongated body below said wing, connected thereto in fixed relationship and having its length extending fore and aft, and a least four thrust-producing units carried by the airplane and operable to exert substantially vertical upward thrust thereon, two of said thrust-producing units being arranged in fore-and-aft alignment, one being carried by the forward portion and the other carried by the aft portion of said body and disposed substantially centrally of said body transversely of the airplane, said thrust-producing unit carried by the forward portion of said body being a propeller unit, and pivot means mounting said propeller unit to tilt about an athwartships axis disposed sufficiently lower than said wing as to locate the propeller unit hub below the upper surface of said wing in all positions of such propeller unit tilted to vary its thrust direction between substantially horizontal and substantially vertical directions.

2. In the airplane defined in claim 1, a leading edge projection plate, and means mounting said leading edge projection plate on the leading portion of the wing immediately rearwardly of the propeller unit carried by the forward portion of the body for movement between an extended position, in which said plate projects forwardly from the leading edge of the wing for obstructing flow of air downward around such leading edge, and a retracted position.

3. In the airplane defined in claim 1, the leading portion of the wing immediately behind the propeller unit carried by the forward portion of the body having slots in its upper and lower surfaces extending spanwise of the wing, and closure means mounted for movement between a position closing such slots and open position affording a path for flow of air through such slots from a relatively high pressure region above the wing into a relatively low pressure region beneath the forward portion of the wing.

4. In the airplane defined in claim 1, a leading edge projection plate, means mounting said leading edge projection plate on the leading portion of the wing immediately rearwardly of the propeller unit carried by the forward portion of the body for movement between an extended position, in which said plate projects forwardly from the leading edge of the wing for obstructing flow of air downward around such leading edge, and a retracted position, and the leading portion of the wing immediately behind the propeller unit carried by the forward portion of the body further having slots in its upper and lower surfaces extending spanwise of the wing, and closure means mounted for movement between a position closing such slots and open position affording a path for flow of air through such slots from a relatively high pressure region above the wing into a relatively low pressure region beneath the forward portion of the wing.

5. In the airplane defined in claim 1, the thrust producing unit carried by the aft portion of the body being a propeller unit including a rotary upright shaft mounted to prevent tilting of the thrust direction of such propeller unit, the pitch of such propeller unit being changeable to reduce the propeller pitch progressively as the forward propeller unit is tilted to move its thrust direction toward horizontal.

6. In the airplane defined in claim 5, power plant means carried by the body and including propeller drive shafts extending fore and aft therefrom and connected to drive the fore and aft propeller units, respectively, and clutch means connected between said power plant means and the aft propeller unit for disconnecting the aft propeller unit from said power plant means.

7. In the airplane defined in claim 1, the thrust-producing unit carried by the aft portion of the body being a propeller unit, and propeller unit tilting means operatively interconnecting the forward propeller unit and the aft propeller unit and effecting coordinated conjoint tilting thereof about athwartships axes spaced lengthwise of the airplane with the thrust direction of the forward propeller unit being more nearly horizontal than the thrust line of the aft propeller unit during swinging of the propeller units between horizontal and vertical thrust directions.

8. In the airplane defined in claim 1, two of the thrust-producing units being mounted respectively on portions of the wing on opposite sides of the longitudinal axis of the fuselage between the leading edge and trailing edge of such wing portions.

9. In the airplane defined in claim 1, downwardly directed gas jets mounted on the wing at opposite sides of the longitudinal axis, respectively, constituting two of the thrust-producing units.

10. In the airplane defined in claim 9, means mounting each jet for swinging about an athwartships axis to direct its thrust line upwardly and forwardly or upwardly and rearwardly.

11. In the airplane defined in claim 10, means effecting swinging of the jets about their respective axes in opposite directions for simultaneously directing the thrust of one jet upwardly and forwardly and the thrust of the other jet upwardly and rearwardly to effect yawing of the airplane.

12. In the airplane defined in claim 1, the elongated body depending from substantially the central portion of the wing and constituting the fuselage, two of the thrust-producing units being mounted respectively on wing portions at opposite sides of the longitudinal axis of the airplane and located between the leading edge and the trailing edge of such wing portions.

13. In the airplane defined in claim 1, the body depending from the wing at one side of the longitudinal axis of the airplane and a second body depending from the wing at the opposite side of such longitudinal axis, the thrust-producing units being propeller units and mounted one in the forward portion of each body and one in the aft portion of each body, the thrust-producing units mounted in the forward portions of the bodies including combustion power plant and propeller units tiltable about athwartships axes to swing the propellers upward from a substantially horizontal thrust direction, the power plant of each forward propeller unit having an exhaust discharge jet for projecting a jet of exhaust gas, and adjustable means connected to said power plants and operable to alter the direction of the jets projected thereby.

14. In the airplane defined in claim 1, the body depending from the wing at one side of the longitudinal axis of the airplane and a second body depending from the wing at the opposite side of such longitudinal axis, the thrust-producing units being propeller units and mounted one in the forward portion of each body and one in the aft portion of each body, a fuselage disposed between the bodies and connected to the wing, jet means mounted in the aft portion of said fuselage, and means operable to direct said jet means laterally from one side or the other side of said fuselage to provide side thrust for effecting yaw of the airplane or downward to effect pitching of the airplane.

15. In the airplane defined in claim 1, the body depending from the wing at one side of the longitudinal axis of the airplane and a second body depending from the wing at the opposite side of such longitudinal axis, the thrust-producing units being propeller units and mounted one in the forward portion of each body and one in the aft portion of each body, the thrust-producing units mounted in the forward portions of the bodies including propeller units tiltable about athwartships axes to swing the propellers upward from a substantially horizontal thrust direction.

16. In an airplane, a wing, an elongated body below said wing connected thereto in fixed relationship and having its length extending fore and aft, a propeller unit carried by the forward portion of said body, pivot means mounting said propeller unit to tilt about an athwartships axis below the upper surface of said wing to vary the thrust direction of said propeller unit between substantially horizontal and substantially vertical, an elongated leading edge projection plate having its length extending spanwise of said wing and disposed directly behind said propeller unit, and means mounting said leading edge projection plate on the leading portion of said wing for movement between an extended position, in which an edge of said plate projects a substantial distance forwardly and downwardly beyond the leading edge of said wing for obstructing flow of air downward around such leading edge, and a retracted position.

17. In an airplane, a wing, an elongated body below said wing, connected thereto in fixed relationship and having its length extending fore and aft, a propeller unit carried by the forward portion of said body, pivot means mounting said propeller unit to tilt about an athwartships axis below the upper surface of said wing to vary the thrust direction of said propeller unit between substantially horizontal and substantially vertical, the leading portion of said wing directly behind said propeller unit having slots in its upper and lower surfaces extending spanwise of the wing for flow of air therethrough from a relatively high pressure region above such wing leading edge portion to a relatively low pressure region beneath such leading edge portion of said wing, and closure means movable from a position closing such slots to a position opening such slots when the thrust direction of said propeller unit is tilted upward from horizontal through a substantial angle to provide a substantial vertical thrust component.

18. In an airplane, a wing, an elongated body below said wing, connected thereto in fixed relationship and having its length extending fore and aft, a propeller unit carried by the forward portion of said body, pivot means mounting said propeller unit to tilt about an athwartships axis below the upper surface of said wing to vary the thrust direction of said propeller unit between substantially horizontal and substantially vertical, an elongated leading edge projection plate having its length extending spanwise of said wing and disposed directly behind said propeller unit, means mounting said leading edge projection plate on the leading portion of said wing for movement between an extended position, in which an edge of said plate projects a substantial distance forwardly and downwardly beyond the leading edge of said wing for obstructing flow of air downward around such leading edge, and a retracted position, the leading portion of said wing directly behind said propeller unit having slots in its upper and lower surfaces extending spanwise of the wing for flow of air therethrough from a relatively high pressure region above such wing leading edge portion to a relatively low pressure region beneath such leading edge portion of said wing, and closure means movable from a position closing such slots to a position opening such slots when the thrust direction of said propeller unit is tilted upward from horizontal through a substantial angle to provide a substantial vertical thrust component.

19. In an airplane defined in claim 18, operating means operatively connected to the leading edge projection plate and to the closure means and operable to effect movement of the closure means to its open position by movement of the leading edge projection plate toward its projecting position and to effect closing movement of said slot-closing means by retracting movement of said leading edge projection plate from projected position.

20. In an airplane, a wing, an elongated body connected to said wing in fixed relationship and having its length extending fore and aft, two propeller units carried respectively one by the forward portion and the other by the aft portion of said body and disposed substantially centrally thereof transversely of the airplane, pivot means mounting said propeller units to tilt about athwartships axes spaced lengthwise of said body, and single propeller unit tilting means operatively connected to both of said propeller units for tilting said propeller units conjointly and including control means controlling relative tilting of said propeller units so that in positions of the propeller unit thrust directions between substantially horizontal and substantially vertical the thrust direction of the forward propeller unit is at a smaller angle to horizontal than the angle between the thrust direction of the rear propeller unit and horizontal.

21. In an airplane, an elongated body having its length extending fore and aft, two propeller units including a tractor propeller carried by the forward portion and a pusher propeller carried by the aft portion of said body, pivot means mounting the forward tractor propeller unit to tilt about an athwartships axis for swinging of its thrust direction upward from substantially horizontal position, pivot means mounting the aft pusher propeller unit to tilt about an athwartships axis for swinging downward about such axis to produce an upward thrust, a plurality of power plant means carried by said body, and propeller drive shaft means extending fore and aft, interconnecting said forward tractor propeller unit and said aft pusher propeller unit and connected in common to said plurality of power plant means to drive both said forward tractor propeller unit and said aft pusher propeller unit conjointly in their various swung positions by more than one of said power plant means.

22. In an airplane, a wing, an elongated body below said wing connected thereto in fixed relationship and having its length extending fore and aft, a forward propeller unit carried by the forward portion of said body forward of said wing, an aft propeller unit carried by the aft portion of said body aft of said wing, each propeller unit being operable to produce an upward thrust, pivot means mounting said forward propeller unit to tilt about an athwartships axis for swinging of its thrust direction upward from substantially horizontal position, power plant means carried by said body, propeller drive shafts extending fore and aft from said power plant means and connected to drive said forward and aft propeller units, respectively, clutch means connected between said power plant means and said aft propeller unit for disconnecting said aft propeller unit from said power plant means, and means separate from said clutch means, operatively connected to said aft propeller unit and operable to alter the thrust produced in an upward direction thereby independent of the speed of said power plant means.

23. In the airplane defined in claim 22, the last means being operable to change the propeller pitch of the aft propeller unit to alter the thrust produced in an upward direction thereby.

24. In the airplane defined in claim 22, the last means being operable to tilt the aft propeller unit about an athwartships axis for downward swinging in varying degrees to alter the thrust produced in an upward direction thereby.

References Cited in the file of this patent

UNITED STATES PATENTS

| | | |
|---|---|---|
| 1,414,241 | Wells | Apr. 25, 1922 |
| 1,814,925 | Hicks | July 14, 1931 |
| 1,933,307 | Bolas | Oct. 31, 1933 |
| 2,223,708 | Van Nes | Dec. 3, 1940 |
| 2,321,837 | Maxwell | June 15, 1943 |
| 2,650,045 | Hunt | Aug. 25, 1953 |
| 2,943,822 | Hamilton | July 5, 1960 |

FOREIGN PATENTS

| | | |
|---|---|---|
| 726,025 | France | Feb. 23, 1932 |